United States Patent
Yang et al.

(10) Patent No.: US 11,128,991 B2
(45) Date of Patent: Sep. 21, 2021

(54) METHOD, APPARATUS, AND SYSTEM FOR FLOOR CONTROL ON MULTIPLE MCPTT SYSTEMS

(71) Applicant: Huawei Technologies Co., Ltd., Shenzhen (CN)

(72) Inventors: Yanmei Yang, Beijing (CN); Cuili Ge, Beijing (CN); Niranth Amogh, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/855,645

(22) Filed: Dec. 27, 2017

(65) Prior Publication Data

US 2018/0124577 A1   May 3, 2018

Related U.S. Application Data

(63) Continuation of application No. PCT/CN2015/082706, filed on Jun. 29, 2015.

(51) Int. Cl.
*H04W 4/08* (2009.01)
*H04W 4/10* (2009.01)
*H04L 29/06* (2006.01)

(52) U.S. Cl.
CPC ........... *H04W 4/08* (2013.01); *H04L 65/4038* (2013.01); *H04L 65/4061* (2013.01); *H04W 4/10* (2013.01); *H04L 65/4046* (2013.01)

(58) Field of Classification Search
CPC ............... H04W 4/06–10; H04W 4/08; H04L 65/4038; H04L 65/4046; H04L 65/4061
See application file for complete search history.

(56) References Cited

U.S. PATENT DOCUMENTS 5,533,098 A    7/1996  Lee
10,225,226 B2*  3/2019  Ko .......................... H04L 51/26
(Continued)

FOREIGN PATENT DOCUMENTS

CN    102572725 A    7/2012
CN    103546874 A    1/2014
(Continued)

OTHER PUBLICATIONS

3GPP TS 23.179 v.0.0.1 3rd Generation Partnership Project; Technical Specification Group Services and System Aspects; Functional architecture and information flows to support mission critical communication services; Stage 2 (Year: 2015).*
(Continued)

*Primary Examiner* — Raymond S Dean
(74) *Attorney, Agent, or Firm* — Slater Matsil, LLP

(57) ABSTRACT

A method, an apparatus and a system for floor control on multiple mission critical push to talk MCPTT systems are disclosed. In an embodiment the method includes receiving, by a first floor control server, a first message from N network element devices, wherein the first message is used to request a floor from the first floor control server, and wherein the N network element devices belong to N MCPTT systems respectively, determining according to the first message, that an MCPTT user in an MCPTT group belonging to a first MCPTT system occupies the floor, wherein the first MCPTT system is an MCPTT system to which a first network element device belongs, and sending a second message to the first network element device, wherein the second message is used to indicate that the MCPTT user in the MCPTT group belonging to the first MCPTT system occupies the floor.

18 Claims, 15 Drawing Sheets

(56) References Cited

U.S. PATENT DOCUMENTS

| | | | |
|---|---|---|---|
| 2006/0056440 A1* | 3/2006 | Khartabil | H04L 12/1822 370/447 |
| 2006/0058007 A1 | 3/2006 | Choksi | |
| 2006/0105793 A1 | 5/2006 | Gutowski et al. | |
| 2007/0058573 A1* | 3/2007 | Schwagmann | H04W 76/45 370/260 |
| 2008/0200162 A1 | 8/2008 | Chowdhury et al. | |
| 2009/0175245 A1 | 7/2009 | Harada et al. | |
| 2014/0066118 A1* | 3/2014 | Pai | H04W 4/10 455/518 |
| 2014/0293843 A1 | 10/2014 | Papasakellariou et al. | |
| 2014/0355508 A1* | 12/2014 | Anchan | H04W 4/10 370/312 |
| 2015/0373510 A1* | 12/2015 | Stojanovski | H04W 36/30 370/312 |
| 2016/0227588 A1* | 8/2016 | Patel | H04W 4/08 |
| 2016/0302048 A1* | 10/2016 | Suzuki | H04W 4/10 |
| 2016/0344726 A1* | 11/2016 | Stojanovski | H04W 4/10 |
| 2018/0034861 A1 | 2/2018 | Gu et al. | |

FOREIGN PATENT DOCUMENTS

| | | |
|---|---|---|
| CN | 103580986 A | 2/2014 |
| CN | 103609147 A | 2/2014 |
| CN | 104618349 A | 5/2015 |
| EP | 2757727 A2 | 7/2014 |
| RU | 2138916 C1 | 9/1999 |
| WO | 03077523 A1 | 9/2003 |
| WO | 2008039003 A1 | 4/2008 |

OTHER PUBLICATIONS

3GPP TS 23.179 V0.1.1 (Jun. 2015), "3rd Generation Partnership Project; Technical Specification Group Services and System Aspects; Functional architecture and information flows to support mission critical communication services; Stage 2 (Release 13)", 51 pages.
Secretary TSG SA, "Report of TSG SA meeting #65", 3GPP TSG SA Meeting #65, Edinburgh, Scotland, Version 1.0.0, Sep. 15-17, 2014, 89 pages.

* cited by examiner

METHOD, APPARATUS, AND SYSTEM FOR FLOOR CONTROL ON MULTIPLE MCPTT SYSTEMS

CROSS-REFERENCE TO RELATED APPLICATIONS

This application is a continuation of International Application No. PCT/CN2015/082706, filed on Jun. 29, 2015, which is hereby incorporated by reference in their entireties.

TECHNICAL FIELD

Embodiments of the present application relate to communications technologies, and in particular, to a method, an apparatus, and a system for floor control on multiple mission critical push to talk (MCPTT) systems.

BACKGROUND

A mission critical push to talk (MCPTT) defines an implementation standard of a push to talk service function in a Long Term Evolution (LTE) network.

In the prior art, a method for floor control on a group session in which one MCPTT system participates includes: when an MCPTT user (the MCPTT user is an associated user of user equipment (UE)) in the MCPTT system needs to occupy floor, sending, by the UE, a floor request message to a floor control server in the MCPTT system; and when the floor control server determines that the MCPTT user is allowed to occupy the floor, instructing the UE to occupy the floor; or when the floor control server determines that the MCPTT user is not allowed to occupy the floor, informing that the UE cannot occupy the floor.

In the prior art, however, there is no implementation manner on how to perform floor control on a group session in which multiple MCPTT systems participate.

SUMMARY

Embodiments of the present application provide a method, an apparatus, and a system for floor control on multiple MCPTT systems.

According to a first aspect, an embodiment of the present application provides a method for floor control on multiple mission critical push to talk MCPTT systems, including: receiving, by a first floor control server, a first message sent by N network element devices, where the first message is used to request floor from the first floor control server, N is an integer greater than or equal to 1, and the N network element devices respectively belong to N MCPTT systems; determining, by the first floor control server according to the first message and a floor control policy, that an MCPTT user in an MCPTT group belonging to a first MCPTT system occupies the floor, where the first MCPTT system is an MCPTT system to which a first network element device belongs, and the first network element device is a network element device in the N network element devices; and sending, by the first floor control server, a second message to the first network element device, where the second message is used to indicate that the MCPTT user in the MCPTT group belonging to the first MCPTT system occupies the floor.

With referent to the first aspect, in a first possible implementation manner of the first aspect, the network element device is a floor control server or a media server.

With reference to the first aspect or the first possible implementation manner of the first aspect, in a second possible implementation manner of the first aspect, the first message sent by the first network element device includes group information of at least one MCPTT group, and the at least one MCPTT group includes a first MCPTT group; accordingly, the determining, by the first floor control server according to the first message and a floor control policy, that an MCPTT user in an MCPTT group belonging to a first MCPTT system occupies the floor includes: determining, by the first floor control server according to the first message and the floor control policy, that an MCPTT user in the first MCPTT group belonging to the first MCPTT system occupies the floor; and accordingly, the second message is specifically used to indicate that the MCPTT user in the first MCPTT group belonging to the first MCPTT system occupies the floor.

With reference to the second possible implementation manner of the first aspect, in a third possible implementation manner of the first aspect, the group information includes at least one of the following: a group identifier or a group priority.

With reference to the first aspect or the first possible implementation manner of the first aspect, in a fourth possible implementation manner of the first aspect, the first message sent by the first network element device includes user information of a first MCPTT user; accordingly, the determining, by the first floor control server according to the first message and a floor control policy, that an MCPTT user in an MCPTT group belonging to a first MCPTT system occupies the floor includes: determining, by the first floor control server according to the first message and the floor control policy, that the first MCPTT user in the MCPTT group belonging to the first MCPTT system occupies the floor; and accordingly, the second message is specifically used to indicate that the first MCPTT user in the MCPTT group belonging to the first MCPTT system occupies the floor.

With reference to the fourth possible implementation manner of the first aspect, in a fifth possible implementation manner of the first aspect, the user information includes at least one of the following: a user identifier, a user role, or user priority information.

With reference to the first aspect or the first possible implementation manner of the first aspect, in a sixth possible implementation manner of the first aspect, the first message sent by the first network element device includes group information of a first MCPTT group, wherein determining, by the first floor control server according to the first message and a floor control policy, that an MCPTT user in an MCPTT group belonging to a first MCPTT system occupies the floor includes determining, by the first floor control server according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

With reference to the first aspect or any one of the first to sixth possible implementation manners of the first aspect, in a seventh possible implementation manner of the first aspect, the method further includes sending, by the first floor control server, a third message to another network element device, where the another network element device is a device, except the first network element device, in the N network element devices; wherein the third message is used to indicate that floor occupation of an MCPTT user in an MCPTT group belonging to a third MCPTT system is rejected, or the third message includes queue information, where the queue information is used to indicate queuing of floor occupied by an MCPTT user in an MCPTT group belonging to a third MCPTT system, and the third MCPTT system is an MCPTT group to which the another network element device belongs.

According to a second aspect, an embodiment of the present application provides a method for floor control on multiple mission critical push to talk MCPTT systems, including: receiving, by a first network element device, a floor request message sent by K user equipment (UEs), where K is an integer greater than or equal to 1, the first network element device belongs to a first MCPTT system, K MCPTT users are respectively associated with the K UEs, and MCPTT groups to which the K MCPTT users respectively belong, belong to the first MCPTT system; sending, by the first network element device, a first message to a first floor control server according to the floor request message, where the first message is used to request floor from the first floor control server; receiving, by the first network element device, a second message sent by the first floor control server, where the second message is used to indicate that an MCPTT user in an MCPTT group belonging to the first MCPTT system occupies the floor; determining, by the first network element device according to the second message, that a first MCPTT user occupies the floor, where the first MCPTT user is an associated user of first UE, and the first UE is UE in the N UEs; and sending, by the first network element device, a floor response message to the first UE, where the floor response message is used to indicate that the first MCPTT user occupies the floor.

With reference to the second aspect, in a first possible implementation manner of the second aspect, the first network element device is a second floor control server or a media server.

With reference to the second aspect or the first possible implementation manner of the second aspect, in a second possible implementation manner of the second aspect, the first message includes group information of the MCPTT groups to which the K MCPTT users requesting the floor from the first network element device belong, and the first MCPTT user belongs to a first MCPTT group, wherein the second message is specifically used to indicate that an MCPTT user in the first MCPTT group belonging to the first MCPTT system occupies the floor; and wherein determining, by the second floor control server according to the second message, that a first MCPTT user occupies the floor includes determining, by the second floor control server according to the second message and a floor control policy and from the first MCPTT group, that the first MCPTT user occupies the floor.

With reference to the second possible implementation manner of the second aspect, in a third possible implementation manner of the second aspect, the group information includes at least one of the following: a group identifier or a group priority.

With reference to the second aspect or the first possible implementation manner of the second aspect, in a fourth possible implementation manner of the second aspect, the sending, by the first network element device, a first message to a first floor control server according to the floor request message includes sending, by the second floor control server, the first message to the first floor control server according to the floor request message sent by the K UEs and a floor control policy, where the first message includes user information of the first MCPTT user in the K MCPTT users requesting the floor from the second floor control server; and wherein the second message is specifically used to indicate that the first MCPTT user in the MCPTT group belonging to the first MCPTT system occupies the floor.

With reference to the fourth possible implementation manner of the second aspect, in a fifth possible implementation manner of the second aspect, the user information includes at least one of the following: a user identifier, a user role, or user priority information.

With reference to the second aspect or the first possible implementation manner of the second aspect, in a sixth possible implementation manner of the second aspect, the sending, by the first network element device, a first message to a first floor control server according to the floor request message includes: sending, by the second floor control server, the first message to the first floor control server according to the floor request message sent by the N UEs and a floor control policy, where the first message includes group information of a first MCPTT group in the MCPTT groups to which the K MCPTT users requesting the floor from the second floor control server respectively belong, and the first MCPTT user belongs to the first MCPTT group; wherein the second message is specifically used to indicate that an MCPTT user in the first MCPTT group belonging to the first MCPTT system occupies the floor; and wherein determining, by the second floor control server according to the second message, that a first MCPTT user occupies the floor includes determining, by the second floor control server according to the second message and the floor control policy and from the first MCPTT group, that the first MCPTT user occupies the floor.

With reference to the second aspect or any one of the first to sixth possible implementation manners of the second aspect, in a seventh possible implementation manner of the second aspect, when an MCPTT system to which the first MCPTT user belongs is different from the first MCPTT system, the receiving, by the first network element device, a floor request message sent by the first UE includes: receiving, by the first network element device, the floor request message that is sent by the first UE directly to the first network element device; or receiving, by the first network element device, the floor request message that is sent by the first UE by using a second network element device to the first network element device, wherein the second network element device is a network element device in the MCPTT system to which the first MCPTT user belongs.

With reference to the first possible implementation manner of the second aspect, in an eighth possible implementation manner of the second aspect, when the first network element device is the second floor control server, the receiving, by the first network element device, a floor request message sent by the first UE includes: receiving, by the first network element device, the floor request message that is sent by the first UE directly to the second floor control server; or receiving, by the first network element device, the floor request message that is sent by the first UE by using the media server to the second floor control server.

According to a third aspect, an embodiment of the present application provides a method for floor control on a mission critical push to talk MCPTT system, where a first floor control server sends, to a first network element device, a second message that is used to indicate that an MCPTT user in an MCPTT group belonging to a first MCPTT system occupies floor, so that the MCPTT user in the MCPTT group belonging to the first MCPTT system occupies the floor, where the first MCPTT system is an MCPTT system to which the first network element device belongs; and the first network element device sends, to first user equipment (UE), a floor response message that is used to indicate that a first MCPTT user occupies the floor, so that the first MCPTT user occupies the floor, where the first MCPTT user is an associated user of the first UE; where the method includes: receiving, by a second media server, user plane data sent by the first UE, where the second media server belongs to the first MCPTT system; and sending, by the second media server, the user plane data to a first media server, so that the first media server forwards the user plane data, wherein an MCPTT system to which the first floor control server belongs includes the first media server.

According to a fourth aspect, an embodiment of the present application provides a method for floor control on a mission critical push to talk MCPTT system, where a first floor control server sends, to a first network element device, a second message that is used to indicate that an MCPTT user in an MCPTT group belonging to a first MCPTT system occupies floor, so that the MCPTT user in the MCPTT group belonging to the first MCPTT system occupies the floor, where the first MCPTT system is an MCPTT system to which the first network element device belongs; and the first network element device sends, to first user equipment (UE), a floor response message that is used to indicate that a first MCPTT user occupies the floor, so that the first MCPTT user occupies the floor, where the first MCPTT user is an associated user of the first UE; where the method includes: receiving, by a first media server, user plane data of the first UE sent by a second media server, where an MCPTT system to which the first floor control server belongs includes the first media server, and the second media server belongs to the first MCPTT system; and forwarding, by the first media server, the user plane data.

With reference to the fourth aspect, in a first possible implementation manner of the fourth aspect, the forwarding, by the first media server, the user plane data includes sending, by the first media server, the user plane data to second UE, where an associated user of the second UE is an MCPTT user in an MCPTT group belonging to the MCPTT system to which the first floor control server belongs.

With reference to the first possible implementation manner of the fourth aspect, in a second possible implementation manner of the fourth aspect, when an MCPTT system to which the second UE belongs is different from the MCPTT system to which the first floor control server belongs, the sending, by the first media server, the user plane data to second UE includes: sending, by the first media server, the user plane data directly to the second UE; or sending, by the first media server, the user plane data by using a third media server to the second UE, wherein the MCPTT system to which the second UE belongs includes the third media server.

With reference to the first or second possible implementation manner of the fourth aspect, in a third possible implementation manner of the fourth aspect, the forwarding, by the first media server, the user plane data further includes: sending, by the first media server, the user plane data to a fourth media server, so that the fourth media server forwards the user plane data to third UE, wherein an associated user of the third UE is an MCPTT user in an MCPTT group belonging to a second MCPTT system, and the second MCPTT system includes the fourth media server.

According to a fifth aspect, an embodiment of the present application provides a method for floor control on multiple mission critical push to talk MCPTT systems, including: receiving, by a first floor control server, a first message sent by N network element devices, where the first message includes user information of an MCPTT user requesting floor from the network element device, the first message is used to request the floor from the first floor control server, N is an integer greater than or equal to 1, and the N network element devices respectively belong to N MCPTT systems; determining, by the first floor control server according to the first message and a floor control policy, that a first MCPTT user belonging to a first MCPTT system occupies the floor, where the first MCPTT system is an MCPTT system to which a first network element device belongs, and the first network element device is a network element device in the N network element devices; and sending, by the first floor control server, a second message to the first network element device, where the second message is used to indicate that the first MCPTT user belonging to the first MCPTT system occupies the floor.

With reference to the fifth aspect, in a first possible implementation manner of the fifth aspect, the user information includes at least one of the following: a user identifier, a user role, or user priority information.

According to a sixth aspect, an embodiment of the present application provides a method for floor control on a mission critical push to talk MCPTT system, where a first floor control server sends, to a first network element device, a second message that is used to indicate that a first MCPTT user belonging to a first MCPTT system occupies floor, so that the first MCPTT user belonging to the first MCPTT system occupies the floor, where the first MCPTT system is an MCPTT system to which the first network element device belongs, and the first MCPTT user is an associated user of first user equipment (UE); where the method includes: receiving, by a second media server, user plane data sent by the first UE, where the second media server belongs to the first MCPTT system; and sending, by the second media server, the user plane data to a first media server, so that the first media server forwards the user plane data, wherein an MCPTT system to which the first floor control server belongs includes the first media server.

According to a seventh aspect, an embodiment of the present application provides a method for floor control on a mission critical push to talk MCPTT system, where a first floor control server sends, to a first network element device, a second message that is used to indicate that a first MCPTT user belonging to a first MCPTT system occupies floor, so that the first MCPTT user belonging to the first MCPTT system occupies the floor, where the first MCPTT system is an MCPTT system to which the first network element device belongs, and the first MCPTT user is an associated user of first user equipment (UE); where the method includes: receiving, by a first media server, user plane data of the first UE sent by a second media server, where an MCPTT system to which the first floor control server belongs includes the first media server, and the second media server belongs to the first MCPTT system; and forwarding, by the first media server, the user plane data.

With reference to the seventh aspect, in a first possible implementation manner of the seventh aspect, the forwarding, by the first media server, the user plane data includes sending, by the first media server, the user plane data to second UE, where an associated user of the second UE is an MCPTT user belonging to the MCPTT system to which the first floor control server belongs.

With reference to the first possible implementation manner of the seventh aspect, in a second possible implementation manner of the seventh aspect, the forwarding, by the first media server, the user plane data further includes: sending, by the first media server, the user plane data to a third media server, so that the third media server forwards the user plane data to third UE, wherein an associated user of the third UE is an MCPTT user belonging to a second MCPTT system, and the second MCPTT system includes the third media server.

According to an eighth aspect, an embodiment of the present application provides an apparatus for floor control on multiple mission critical push to talk MCPTT systems, where the apparatus is a first floor control server, and the apparatus includes: a receiving module, configured to receive a first message sent by N network element devices, where the first message is used to request floor from the first floor control server, N is an integer greater than or equal to 1, and the N network element devices respectively belong to N MCPTT systems; a processing module, configured to determine, according to the first message and a floor control policy, that an MCPTT user in an MCPTT group belonging to a first MCPTT system occupies the floor, where the first MCPTT system is an MCPTT system to which a first network element device belongs, and the first network element device is a network element device in the N network element devices; and a sending module, configured to send a second message to the first network element device, where the second message is used to indicate that the MCPTT user in the MCPTT group belonging to the first MCPTT system occupies the floor.

With reference to the eighth aspect, in a first possible implementation manner of the eighth aspect, the network element device is a floor control server or a media server.

With reference to the eighth aspect or the first possible implementation manner of the eighth aspect, in a second possible implementation manner of the eighth aspect, the first message sent by the first network element device includes group information of at least one MCPTT group, and the at least one MCPTT group includes a first MCPTT group; wherein the processing module is specifically configured to determine, according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

With reference to the second possible implementation manner of the eighth aspect, in a third possible implementation manner of the eighth aspect, the group information includes at least one of the following: a group identifier or a group priority.

With reference to the eighth aspect or the first possible implementation manner of the eighth aspect, in a fourth possible implementation manner of the eighth aspect, the first message sent by the first network element device includes user information of a first MCPTT user; wherein the processing module is specifically configured to determine, according to the first message and the floor control policy, that the first MCPTT user in the MCPTT group belonging to the first MCPTT system occupies the floor; and wherein the second message is specifically used to indicate that the first MCPTT user in the MCPTT group belonging to the first MCPTT system occupies the floor.

With reference to the fourth possible implementation manner of the eighth aspect, in a fifth possible implementation manner of the eighth aspect, the user information includes at least one of the following: a user identifier, a user role, or user priority information.

With reference to the eighth aspect or the first possible implementation manner of the eighth aspect, in a sixth possible implementation manner of the eighth aspect, the first message sent by the first network element device includes group information of a first MCPTT group; wherein the processing module is specifically configured to determine, according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

With reference to the eighth aspect or any one of the first to sixth possible implementation manners of the eighth aspect, in a seventh possible implementation manner of the eighth aspect, the sending module is further configured to send a third message to another network element device, where the another network element device is a device, except the first network element device, in the N network element devices; wherein the third message is used to indicate that floor occupation of an MCPTT user in an MCPTT group belonging to a third MCPTT system is rejected, or the third message includes queue information, where the queue information is used to indicate queuing of floor occupied by an MCPTT user in an MCPTT group belonging to a third MCPTT system, and the third MCPTT system is an MCPTT group to which the another network element device belongs.

According to a ninth aspect, an embodiment of the present application provides an apparatus for floor control on multiple mission critical push to talk MCPTT systems, where the apparatus is a first network element device, and the apparatus includes: a receiving module, configured to receive a floor request message sent by K user equipment (UEs), where K is an integer greater than or equal to 1, the first network element device belongs to a first MCPTT system, K MCPTT users are respectively associated with the K UEs, and MCPTT groups to which the K MCPTT users respectively belong, belong to the first MCPTT system; a sending module, configured to send a first message to a first floor control server according to the floor request message, where the first message is used to request floor from the first floor control server, wherein the receiving module is further configured to receive a second message sent by the first floor control server, where the second message is used to indicate that an MCPTT user in an MCPTT group belonging to the first MCPTT system occupies the floor; and a processing module, configured to determine, according to the second message, that a first MCPTT user occupies the floor, where the first MCPTT user is an associated user of first UE, and the first UE is UE in the N UEs, wherein the sending module is further configured to send a floor response message to the first UE, where the floor response message is used to indicate that the first MCPTT user occupies the floor.

With reference to the ninth aspect, in a first possible implementation manner of the ninth aspect, the first network element device is a second floor control server or a media server.

With reference to the ninth aspect or the first possible implementation manner of the ninth aspect, in a second possible implementation manner of the ninth aspect, the first message includes group information of the MCPTT groups to which the K MCPTT users requesting the floor from the first network element device belong, and the first MCPTT user belongs to a first MCPTT group; wherein the second message is specifically used to indicate that an MCPTT user in the first MCPTT group belonging to the first MCPTT system occupies the floor; and wherein the processing module is specifically configured to determine, according to the second message and a floor control policy and from the first MCPTT group, that the first MCPTT user occupies the floor.

With reference to the second possible implementation manner of the ninth aspect, in a third possible implementation manner of the ninth aspect, the group information includes at least one of the following: a group identifier or a group priority.

With reference to the ninth aspect or the first possible implementation manner of the ninth aspect, in a fourth possible implementation manner of the ninth aspect, that the sending module sends the first message to the first floor control server according to the floor request message specifically includes: sending the first message to the first floor control server according to the floor request message sent by the K UEs and a floor control policy, where the first message includes user information of the first MCPTT user in the K MCPTT users requesting the floor from the second floor control server; and wherein the second message is specifically used to indicate that the first MCPTT user in the MCPTT group belonging to the first MCPTT system occupies the floor.

With reference to the fourth possible implementation manner of the ninth aspect, in a fifth possible implementation manner of the ninth aspect, the user information includes at least one of the following: a user identifier, a user role, or user priority information.

With reference to the ninth aspect or the first possible implementation manner of the ninth aspect, in a sixth possible implementation manner of the ninth aspect, that the sending module sends the first message to the first floor control server according to the floor request message specifically includes: sending the first message to the first floor control server according to the floor request message and a floor control policy, where the first message includes group information of a first MCPTT group in the MCPTT groups to which the K MCPTT users requesting the floor from the second floor control server respectively belong, and the first MCPTT user belongs to the first MCPTT group; wherein the second message is specifically used to indicate that an MCPTT user in the first MCPTT group belonging to the first MCPTT system occupies the floor; and wherein the processing module is specifically configured to determine, according to the second message and a floor control policy and from the first MCPTT group, that the first MCPTT user occupies the floor.

With reference to the ninth aspect or any one of the first to sixth possible implementation manners of the ninth aspect, in a seventh possible implementation manner of the ninth aspect, when an MCPTT system to which the first MCPTT user belongs is different from the first MCPTT system, that the receiving module receives the floor request message sent by the first UE specifically includes: receiving the floor request message that is sent by the first UE directly to the first network element device; or receiving the floor request message that is sent by the first UE by using a second network element device to the first network element device, wherein the second network element device is a network element device in the MCPTT system to which the first MCPTT user belongs.

With reference to the first possible implementation manner of the ninth aspect, in an eighth possible implementation manner of the ninth aspect, when the first network element device is the second floor control server, that the receiving module receives the floor request message sent by the first UE specifically includes: receiving the floor request message that is sent by the first UE directly to the second floor control server; or receiving the floor request message that is sent by the first UE by using the media server to the second floor control server.

According to a tenth aspect, an embodiment of the present application provides an apparatus for floor control on a mission critical push to talk MCPTT system, where the apparatus is a second media server; a first floor control server sends, to a first network element device, a second message that is used to indicate that an MCPTT user in an MCPTT group belonging to a first MCPTT system occupies floor, so that the MCPTT user in the MCPTT group belonging to the first MCPTT system occupies the floor, where the first MCPTT system is an MCPTT system to which the first network element device belongs; the first network element device sends, to first user equipment (UE), a floor response message that is used to indicate that a first MCPTT user occupies the floor, so that the first MCPTT user occupies the floor, where the first MCPTT user is an associated user of the first UE; and the second media server belongs to the first MCPTT system; where the apparatus includes: a receiving module, configured to receive user plane data sent by the first UE; and a forwarding module, configured to send the user plane data to a first media server, so that the first media server forwards the user plane data, wherein an MCPTT system to which the first floor control server belongs includes the first media server.

According to an eleventh aspect, an embodiment of the present application provides an apparatus for floor control on a mission critical push to talk MCPTT system, where the apparatus is a first media server; a first floor control server sends, to a first network element device, a second message that is used to indicate that an MCPTT user in an MCPTT group belonging to a first MCPTT system occupies floor, so that the MCPTT user in the MCPTT group belonging to the first MCPTT system occupies the floor, where the first MCPTT system is an MCPTT system to which the first network element device belongs; the first network element device sends, to first user equipment (UE), a floor response message that is used to indicate that a first MCPTT user occupies the floor, so that the first MCPTT user occupies the floor, where the first MCPTT user is an associated user of the first UE; a second media server belongs to the first MCPTT system; and an MCPTT system to which the first floor control server belongs includes the first media server; where the apparatus includes: a receiving module, configured to receive user plane data of the first UE sent by the second media server; and a forwarding module, configured to forward the user plane data.

With reference to the eleventh aspect, in a first possible implementation manner of the eleventh aspect, the forwarding module is specifically configured to send the user plane data to second UE, where an associated user of the second UE is an MCPTT user in an MCPTT group belonging to the MCPTT system to which the first floor control server belongs.

With reference to the first possible implementation manner of the eleventh aspect, in a second possible implementation manner of the eleventh aspect, when an MCPTT system to which the second UE belongs is different from the MCPTT system to which the first floor control server belongs, the forwarding module is specifically configured to: send the user plane data directly to the second UE; or send the user plane data by using a third media server to the second UE, wherein the MCPTT system to which the second UE belongs includes the third media server.

With reference to the first or second possible implementation manner of the eleventh aspect, in a third possible implementation manner of the eleventh aspect, the forwarding module is further configured to send the user plane data to a fourth media server, so that the fourth media server forwards the user plane data to third UE; wherein an associated user of the third UE is an MCPTT user in an MCPTT group belonging to a second MCPTT system, and the second MCPTT system includes the fourth media server.

According to a twelfth aspect, an embodiment of the present application provides an apparatus for floor control on multiple mission critical push to talk MCPTT systems, where the apparatus is a first floor control server, and the apparatus includes: a receiving module, configured to receive a first message sent by N network element devices, where the first message includes user information of an MCPTT user requesting floor from the network element device, the first message is used to request the floor from the first floor control server, N is an integer greater than or equal to 1, and the N network element devices respectively belong to N MCPTT systems; a processing module, configured to determine, according to the first message and a floor control policy, that a first MCPTT user belonging to a first MCPTT system occupies the floor, where the first MCPTT system is an MCPTT system to which a first network element device belongs, and the first network element device is a network element device in the N network element devices; and a sending module, configured to send a second message to the first network element device, where the second message is used to indicate that the first MCPTT user belonging to the first MCPTT system occupies the floor.

With reference to the twelfth aspect, in a first possible implementation manner of the twelfth aspect, the user information includes at least one of the following: a user identifier, a user role, or user priority information.

According to a thirteenth aspect, an embodiment of the present application provides an apparatus for floor control on a mission critical push to talk MCPTT system, where the apparatus is a second media server; a first floor control server sends, to a first network element device, a second message that is used to indicate that a first MCPTT user belonging to a first MCPTT system occupies floor, so that the first MCPTT user belonging to the first MCPTT system occupies the floor, where the first MCPTT system is an MCPTT system to which the first network element device belongs, the first MCPTT user is an associated user of first user equipment (UE), and the second media server belongs to the first MCPTT system; where the apparatus includes: a receiving module, configured to receive user plane data sent by the first UE; and a forwarding module, configured to send the user plane data to a first media server, so that the first media server forwards the user plane data, wherein an MCPTT system to which the first floor control server belongs includes the first media server.

According to a fourteenth aspect, an embodiment of the present application provides an apparatus for floor control on a mission critical push to talk MCPTT system, where the apparatus is a first media server; a first floor control server sends, to a first network element device, a second message that is used to indicate that a first MCPTT user belonging to a first MCPTT system occupies floor, so that the first MCPTT user belonging to the first MCPTT system occupies the floor, where the first MCPTT system is an MCPTT system to which the first network element device belongs, the first MCPTT user is an associated user of first user equipment (UE), an MCPTT system to which the first floor control server belongs includes the first media server, and a second media server belongs to the first MCPTT system; where the apparatus includes: a receiving module, configured to receive user plane data of the first UE sent by the second media server; and a forwarding module, configured to forward the user plane data.

With reference to the fourteenth aspect, in a first possible implementation manner of the fourteenth aspect, the forwarding module is specifically configured to send the user plane data to second UE, where an associated user of the second UE is an MCPTT user belonging to the MCPTT system to which the first floor control server belongs.

With reference to the first possible implementation manner of the fourteenth aspect, in a second possible implementation manner of the fourteenth aspect, the forwarding module is further configured to send the user plane data to a third media server, so that the third media server forwards the user plane data to third UE; wherein an associated user of the third UE is an MCPTT user belonging to a second MCPTT system, and the second MCPTT system includes the third media server.

According to a fifteenth aspect, an embodiment of the present application provides a system for floor control on a mission critical push to talk MCPTT system, including the first floor control server according to the eighth aspect or any one of the first to seventh possible implementation manners of the eighth aspect, and the first network element device according to the ninth aspect or any one of the first to eighth possible implementation manners of the ninth aspect.

With reference to the fifteenth aspect, in a first possible implementation manner of the fifteenth aspect, the system further includes the second media server according to the tenth aspect, and the first media server according to the eleventh aspect or any one of the first to third possible implementation manners of the eleventh aspect.

According to a sixteenth aspect, an embodiment of the present application provides a system for floor control on a mission critical push to talk MCPTT system, including the first floor control server according to the twelfth aspect or the first possible implementation manner of the twelfth aspect, the second media server according to the thirteenth aspect, and the first media server according to the fourteenth aspect or either of the first and second possible implementation manners of the fourteenth aspect.

The present application provides a method, an apparatus, and a system for floor control on multiple MCPTT systems. After receiving a first message sent by N network element devices, a first floor control server determines, according to the first message sent by the N network element devices and a floor control policy, to send a second message to a first network element device in the N network element devices, where the second message is used for an MCPTT user in an MCPTT group belonging to a first MCPTT system to occupy floor, and the first MCPTT system is an MCPTT system to which the first network element device belongs. Therefore, a first floor control server in an MCPTT system to which an MCPTT group in multiple MCPTT groups participating in a current group call session belongs can manage floor of an MCPTT user in an MCPTT group belonging to another MCPTT system, so that floor control in a group session in which multiple MCPTT systems participate is implemented.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show some embodiments of the present application, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1A:
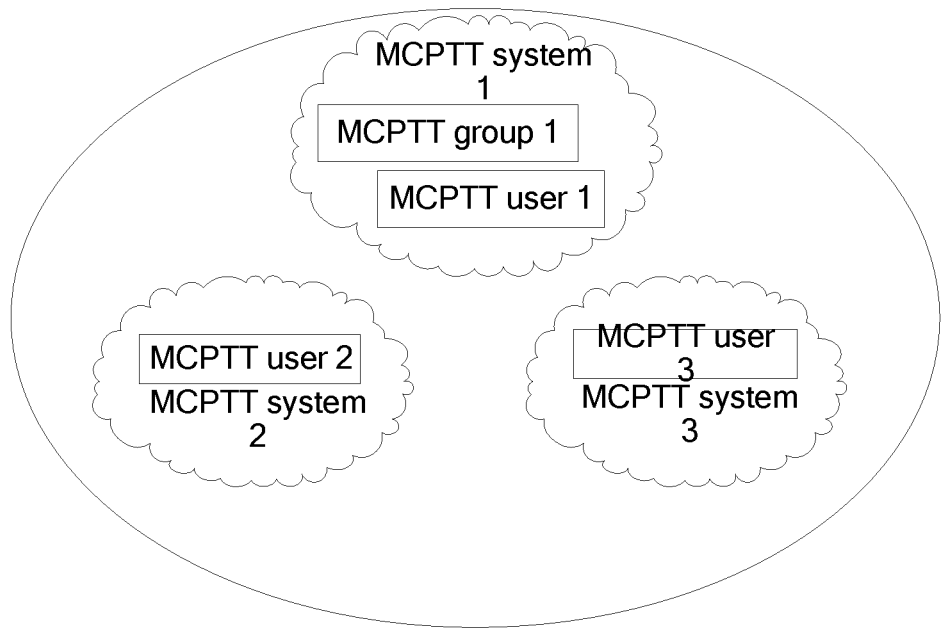
FIG. 1A is a schematic diagram of an application scenario of a method for floor control on multiple MCPTT systems according to the present application.

FIG. 1A is a schematic diagram of an application scenario of a method for floor control on multiple MCPTT systems according to the present application. As shown in FIG. 1A, the multiple MCPTT systems include an MCPTT system 1, an MCPTT system 2, and an MCPTT system 3; an MCPTT user 1 belongs to the MCPTT system 1, an MCPTT user 2 belongs to the MCPTT system 2, and an MCPTT user 3 belongs to the MCPTT system 3; the MCPTT user 1, the MCPTT user 2, and the MCPTT user 3 belong to an MCPTT group 1, and the MCPTT group 1 belongs to the MCPTT system 1.

It should be noted that there are three MCPTT systems in FIG. 1A, and a quantity of MCPTT users included in each MCPTT system is merely exemplary.

It should be noted that an MCPTT system to which an MCPTT user belongs is an MCPTT system to which the MCPTT user subscribes. For example, when an MCPTT user A subscribes to an MCPTT system A, an MCPTT system to which the MCPTT user A belongs is the MCPTT system A, and the MCPTT user A belongs to the MCPTT system A. A MCPTT system to which an MCPTT group belongs may be considered as an MCPTT system that defines the MCPTT group. For example, when an MCPTT group A is defined in an MCPTT system A, an MCPTT system to which the MCPTT group A belongs is the MCPTT system A, and the MCPTT group A belongs to the MCPTT system A.

It should be noted that each MCPTT system in the present application includes a floor control server (Floor Control Server) and one or more media servers (Media Server); MCPTT systems may be divided by a floor control server, that is, an MCPTT system is in a one-to-one correspondence with a floor control server.

The floor control server is configured to make a decision and/or perform queuing on multiple received floor requests. The media server is configured to forward user plane data. The floor control server and the media server may be implemented by using hardware and/or software.

It should be noted that FIG. 1A is a multi-MCPTT system scenario in which there is one MCPTT group, and MCPTT systems to which the MCPTT group and MCPTT users in the MCPTT group belong are different.

Figure 1B:
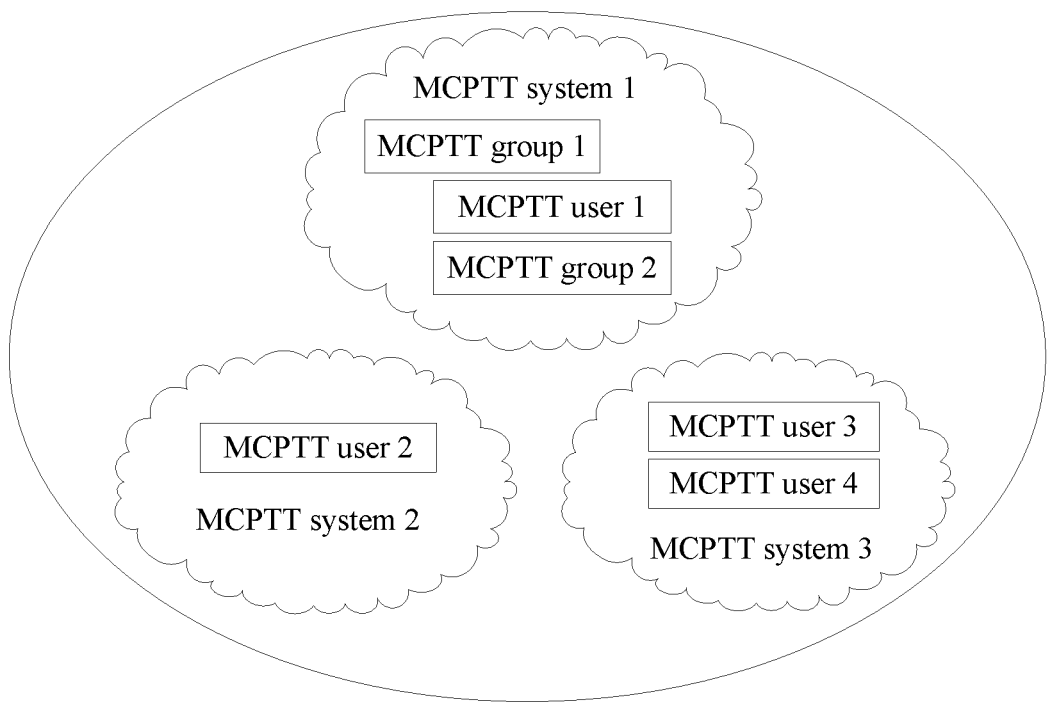
FIG. 1B is a schematic diagram of another application scenario of a method for floor control on multiple MCPTT systems according to the present application.

FIG. 1B is a schematic diagram of another application scenario of a method for floor control on multiple MCPTT systems according to the present application. As shown in FIG. 1B, the multiple MCPTT systems include an MCPTT system 1, an MCPTT system 2, and an MCPTT system 3; an MCPTT user 1 belongs to the MCPTT system 1, an MCPTT user 2 belongs to the MCPTT system 2, and an MCPTT user 3 and an MCPTT user 4 belong to the MCPTT system 3; the MCPTT user 1 and the MCPTT user 4 belong to an MCPTT group 1, the MCPTT user 2 and the MCPTT user 3 belong to an MCPTT group 2, and the MCPTT group 1 and the MCPTT group 2 belong to the MCPTT system 1.

It should be noted that there are three MCPTT systems in FIG. 1B, and a quantity of MCPTT users included in each MCPTT system is merely exemplary.

It should be noted that the application scenario shown in FIG. 1B is used to meet a requirement in which, in some special scenarios, MCPTT users in different MCPTT groups belonging to a same MCPTT system need to communicate with each other to cooperatively complete a task. An inventive precondition in the present application related to FIG. 1B is that establishment of a session between multiple MCPTT groups (for example, an MCPTT group 1 and an MCPTT group 2) is already completed and the session is in an active state.

It should be noted that FIG. 1B is a multi-MCPTT system scenario in which there are multiple MCPTT groups, the multiple MCPTT groups belong to a same MCPTT system, and MCPTT systems to which the multiple MCPTT groups and MCPTT users in the multiple MCPTT groups belong are different.

It should be noted that a first floor control server in embodiments of the present application related to FIG. 1A and FIG. 1B is a floor control server in an MCPTT system, to which an MCPTT group belongs, in multiple MCPTT systems.

Figure 2:
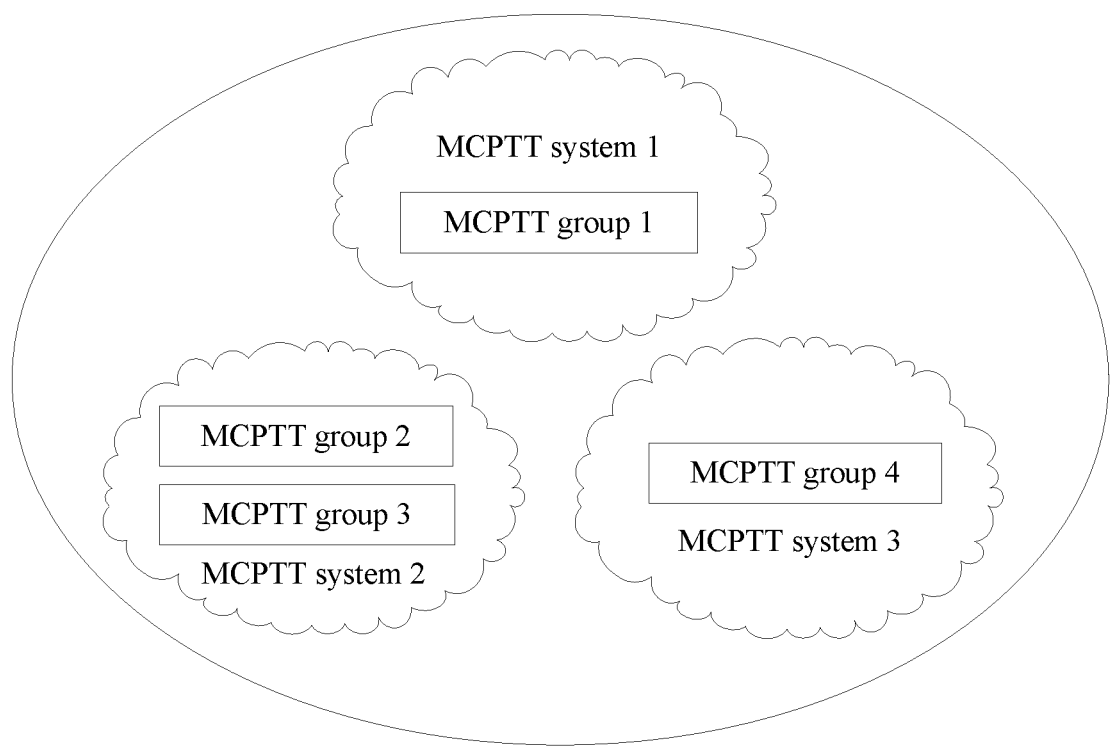
FIG. 2 is a schematic diagram of still another application scenario of a method for floor control on multiple MCPTT systems according to the present application.

FIG. 2 is a schematic diagram of still another application scenario of a method for floor control on multiple MCPTT systems according to the present application. As shown in FIG. 2, the multiple MCPTT systems include an MCPTT system 1, an MCPTT system 2, and an MCPTT system 3; an MCPTT group 1 belongs to the MCPTT system 1, an MCPTT group 2 and an MCPTT group 3 belong to the MCPTT system 2, and an MCPTT group 4 belongs to the MCPTT system 3.

It should be noted that, that there are three MCPTT systems, there are four groups in multiple MCPTT groups, and the like in FIG. 2 are merely exemplary.

It should be noted that the application scenario shown in FIG. 2 is used to meet a requirement in which, in some scenarios, MCPTT users in different MCPTT groups belonging to different MCPTT systems need to communicate with each other to cooperatively complete a task. An inventive precondition in the present application related to FIG. 2 is that establishment of a session between multiple MCPTT groups (for example, an MCPTT group 1, an MCPTT group 2, an MCPTT group 3, and an MCPTT group 4) is already completed.

It should be noted that FIG. 2 is a multi-MCPTT system scenario in which there are multiple MCPTT groups, and MCPTT systems to which the multiple MCPTT groups belong are different.

It should be noted that a first floor control server in an embodiment of the present application related to FIG. 2 is a floor control server in an MCPTT system to which any MCPTT group in multiple MCPTT groups belongs.

Figure 3:
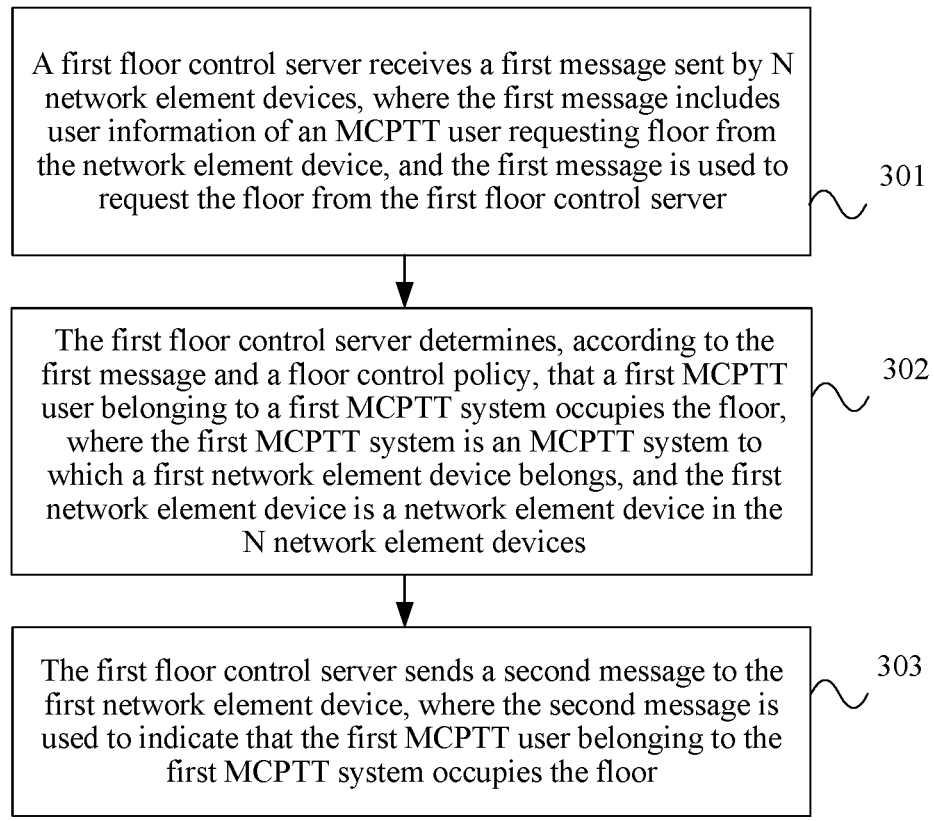
FIG. 3 is a flowchart of Embodiment 1 of a method for floor control on multiple MCPTT systems according to the present application.

FIG. 3 is a flowchart of Embodiment 1 of a method for floor control on multiple MCPTT systems according to the present application. This embodiment is applied to the application scenarios shown in FIGS. 1A and 1B. As shown in FIG. 3, the method in this embodiment may include the following steps.

Step 301: A first floor control server receives a first message sent by N network element devices, where the first message includes user information of an MCPTT user requesting floor from the network element device, and the first message is used to request the floor from the first floor control server.

N is an integer greater than or equal to 1, and the N network element devices respectively belong to N MCPTT systems.

Optionally, the user information includes at least one of the following: a user identifier, a user role, or user priority information. The user identifier may be a user identifier temporarily generated by the network element device for the MCPTT user. The user role may be a role played by the MCPTT user. The user priority information may be a priority of a user or a priority of a user role.

It should be noted that a network element device in embodiments related to FIG. 1A and FIG. 1B is a network element device in an MCPTT system to which the MCPTT user belongs.

Step 302: The first floor control server determines, according to the first message and a floor control policy, that a first MCPTT user belonging to a first MCPTT system occupies the floor, where the first MCPTT system is an MCPTT system to which a first network element device belongs, and the first network element device is a network element device in the N network element devices.

Optionally, the first network element device may be a second floor control server or a second media server.

Optionally, the floor control policy in step 302 may be a policy based on a receiving sequence of a message (that is, the first message), a policy based on a user priority, or the like.

If an MCPTT user already occupies the floor before step 302 is performed, the first floor control server may alternatively determine, according to the floor control policy, that the MCPTT user continues to occupy the floor or that another MCPTT user in the MCPTT system to which the network element device sending the first message belongs occupies the floor.

Step 303: The first floor control server sends a second message to the first network element device, where the second message is used to indicate that the first MCPTT user belonging to the first MCPTT system occupies the floor.

In this embodiment, after a first floor control server receives a first message sent by N network element devices, the first floor control server determines, according to the first message sent by the N network element devices and a floor control policy, to send a second message to a first network element device, where the second message is used for a first MCPTT user belonging to a first MCPTT system to occupy floor, and the first MCPTT system is an MCPTT system to which the first network element device belongs. Therefore, the first floor control server in an MCPTT system to which one or more MCPTT groups participating in a current group call session belong can manage floor of an MCPTT user, belonging to another MCPTT system, in the one or more MCPTT groups, so that floor control in a group session in which multiple MCPTT systems participate is implemented.

Figure 4:
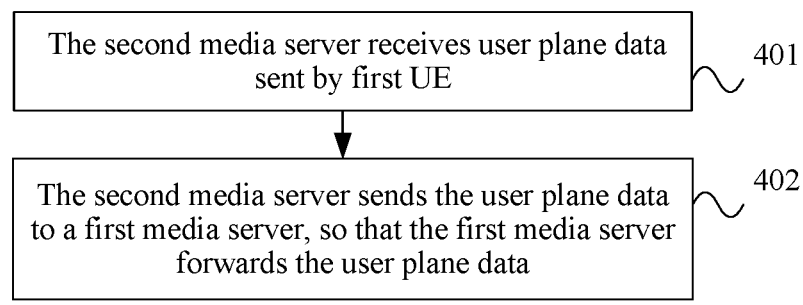
FIG. 4 is a flowchart of Embodiment 2 of a method for floor control on multiple MCPTT systems according to the present application.

FIG. 4 is a flowchart of Embodiment 2 of a method for floor control on multiple MCPTT systems according to the present application. As shown in FIG. 4, based on the embodiment shown in FIG. 3, this embodiment may further include the following steps.

Step 401: The second media server receives user plane data sent by first UE.

The first MCPTT user is an associated user of the first UE.

Step 402: The second media server sends the user plane data to a first media server, so that the first media server forwards the user plane data.

A MCPTT system to which the first floor control server belongs includes the first media server.

In this embodiment of the present application, a second media server receives user plane data sent by first UE, and the second media server sends the user plane data to a first media server, so that the first media server forwards the user plane data. Therefore, after an MCPTT user, belonging to an MCPTT system of the second media server, in one or more MCPTT groups participating in a current group call session obtains floor, the MCPTT user can forward user plane data (for example, speech content), by using a media server (that is, the first media server) in an MCPTT system to which the one or more MCPTT groups belong, to another MCPTT user in the one or more MCPTT groups, so that transmission of user plane data in a group call in which multiple MCPTT systems participate is implemented.

Figure 5:
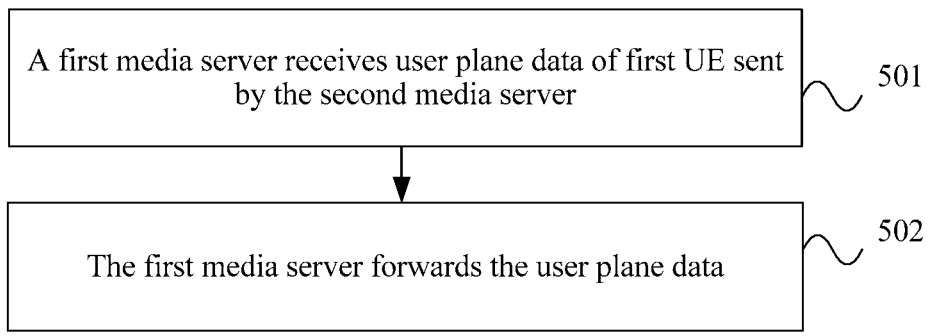
FIG. 5 is a flowchart of Embodiment 3 of a method for floor control on multiple MCPTT systems according to the present application.

FIG. 5 is a flowchart of Embodiment 3 of a method for floor control on multiple MCPTT systems according to the present application. As shown in FIG. 5, based on the embodiment shown in FIG. 3, this embodiment may further include the following steps.

Step 501: A first media server receives user plane data of first UE sent by the second media server.

The first MCPTT user is an associated user of the first UE, and an MCPTT system to which the first floor control server belongs includes the first media server.

Step 502: The first media server forwards the user plane data.

Optionally, the forwarding, by the first media server, the user plane data includes sending, by the first media server, the user plane data to second UE, where an associated user of the second UE is an MCPTT user belonging to the MCPTT system to which the first floor control server belongs.

Further, optionally, the forwarding, by the first media server, the user plane data further includes: sending, by the first media server, the user plane data to a third media server, so that the third media server forwards the user plane data to third UE, wherein an associated user of the third UE is an MCPTT user belonging to a second MCPTT system, and the second MCPTT system includes the third media server.

In this embodiment of the present application, a first media server receives user plane data of first UE sent by a second media server, and the first media server forwards the user plane data. Therefore, after an MCPTT user, belonging to an MCPTT system of the second media server, in one or more MCPTT groups participating in a current group call session obtains floor, the MCPTT user can forward user plane data (for example, speech content), by using a media server (that is, the first media server) in an MCPTT system to which the one or more MCPTT groups belong, to another MCPTT user in the one or more MCPTT groups, so that transmission of user plane data in a group call in which multiple MCPTT systems participate is implemented.

Figure 6:
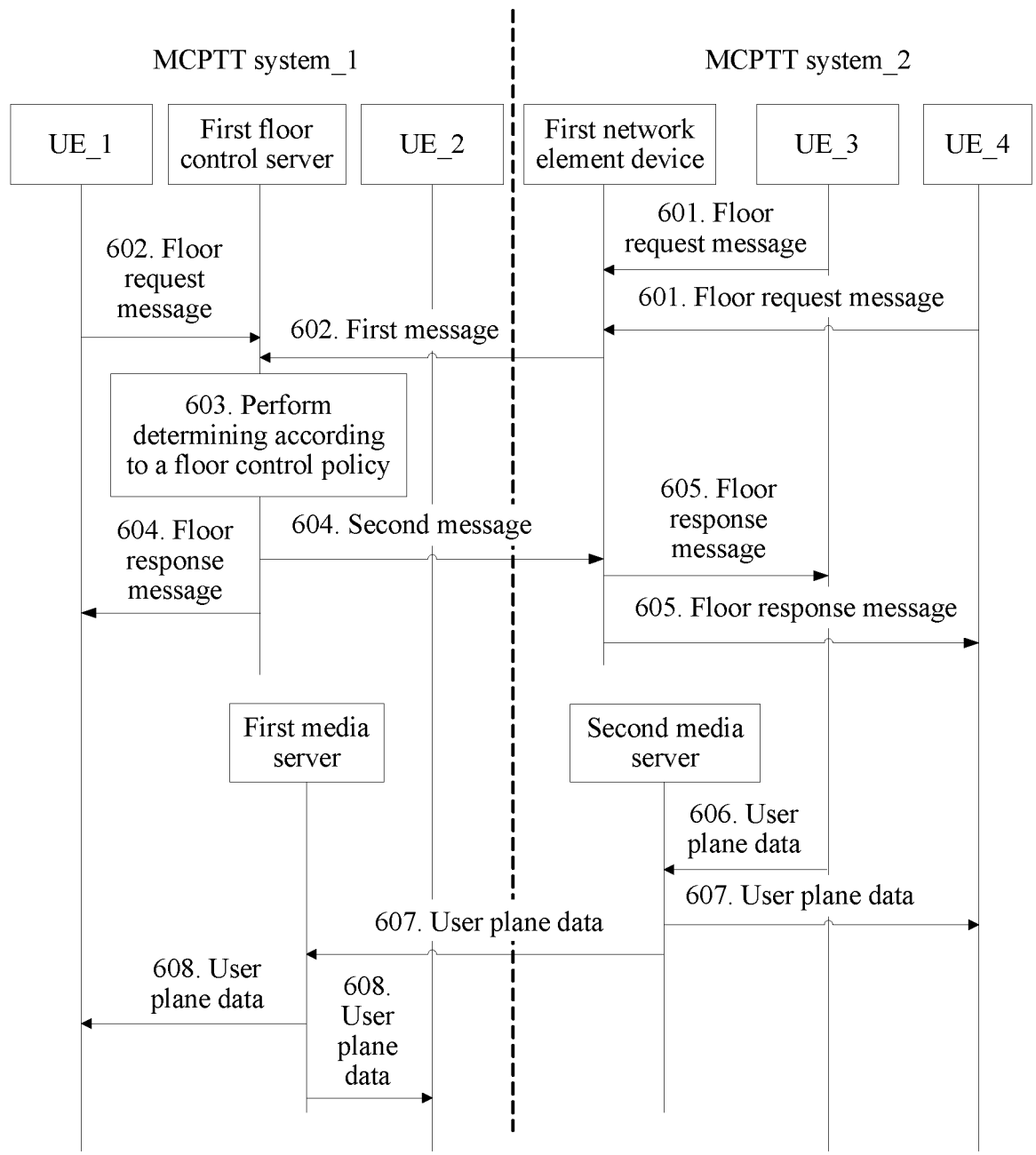
FIG. 6 is a flowchart of Embodiment 4 of a method for floor control on multiple MCPTT systems according to the present application.

FIG. 6 is a flowchart of Embodiment 4 of a method for floor control on multiple MCPTT systems according to the present application. This embodiment is applied to the application scenarios shown in FIGS. 1A and 1B. As shown in FIG. 6, the method in this embodiment may include the following steps.

Step 601: A first network element device receives a floor request message sent by UE_3 and UE_4.

The UE_3 and the UE_4 belong to an MCPTT system_2, and the first network element device belongs to the MCPTT system_2.

Optionally, the first network element device may be a second floor control server or a second media server.

It should be noted that a time point at which the first network element device receives a floor request message sent by the UE_3 and a time point at which the first network element device receives a floor request message sent by the UE_4 may be a time point in a preset time window or may be a same time point.

Step 602: A first floor control server receives a first message sent by the first network element device and a floor request message sent by UE_1.

The first message may be determined by the first network element device according to the floor request message sent by the UE_3 and the UE_4. The first message may include user information of a MCPTT_User3 and a MCPTT_User4, or the first message may include group information of MCPTT groups to which the MCPTT_User3 and the MCPTT_User4 respectively belong. The MCPTT_User3 is an associated user of the UE_3, and the MCPTT_User4 is an associated user of the UE_4.

Optionally, the user information includes at least one of the following: a user identifier, a user role, or user priority information.

A MCPTT_User1 and a MCPTT_User2 belong to an MCPTT system_1. The MCPTT_User1 is an associated user of the UE_1, and the MCPTT_User2 is an associated user of the UE_2. The first floor control server belongs to the MCPTT system_1.

It should be noted that a time point at which the first floor control server receives the floor request message sent by the UE_1 and a time point at which the first floor control server receives the first message sent by the first network element device may be a time point in a preset time window or may be a same time point.

Step 603: The first floor control server determines, according to the first message sent by the first network element device, the floor request message sent by the UE_1, and a floor control policy, that the MCPTT_User3 belonging to the MCPTT system_2 occupies floor.

Optionally, the floor control policy in step 603 may be a policy based on a sequence of a message (that is, the first message and the floor request message), a policy based on a user priority, or the like.

For example, when the floor control policy is the policy based on a user priority and a role priority of the MCPTT_User3 is higher than role priorities of the MCPTT_User4 and the MCPTT_user1, it is determined that the MCPTT_User3 occupies the floor.

Step 604: The first floor control server sends a second message to the first network element device, and sends a floor response message to the UE_1.

The second message is used to indicate that the MCPTT_User3 belonging to the MCPTT system_2 occupies the floor, and the floor response message sent to the UE_1 is used to indicate that floor occupation of the MCPTT_User1 is rejected.

It should be noted that there is no sequence between the sending, by the first floor control server, the second message to the first network element device and the sending, by the first floor control server, the floor response message to the UE_1.

Step 605: The first network element device sends a floor response message to the UE_3 and the UE_4 according to the second message.

The floor response message sent to the UE_3 is used to indicate that the MCPTT_User3 occupies the floor, and the floor response message sent to the UE_4 is used to indicate that floor occupation of the MCPTT_User4 is rejected.

It should be noted that there is no sequence between the sending, by the first network element device, the floor response message to the UE_3 and the sending, by the first network element device, the floor response message to the UE_4.

Step 606: A second media server receives user plane data sent by the UE_3.

The second media server belongs to the MCPTT system_2.

Step 607: The second media server sends the user plane data to the UE_4 and a first media server.

The first media server belongs to the MCPTT system_1.

Step 608: The first media server sends the user plane data to the UE_1 and the UE_2.

It should be noted that in this embodiment, there are two MCPTT systems included in the multiple MCPTT systems, there are two UEs in the MCPTT system_2 that request the floor from the first network element device, and there is one UE in the MCPTT system_1 that requests the floor from the first floor control server. This is merely exemplary.

It should be noted that in this embodiment, the MCPTT_User1, MCPTT_User2, MCPTT_User3, and MCPTT_User4 may belong to a same MCPTT group, or may belong to different MCPTT groups, where the same MCPTT group or the different MCPTT groups belong to the MCPTT system_1.

In this embodiment, a first floor control server determines, according to a first message (the first message includes user information of an MCPTT_User3 and an MCPTT_User4, or group information of MCPTT groups to which the MCPTT_User3 and the MCPTT_User4 belong) sent by a first network element device, a floor request message sent by UE_1, and a floor control policy, that the MCPTT_User3 occupies floor, so that floor control in a group session in which multiple MCPTT systems participate is implemented. Further, a second media server receives user plane data sent by UE_3, and sends the user plane data to a first media server, and the first media server forwards the user plane data to the UE_1 and UE_2, so that transmission of user plane data in a group call in which multiple MCPTT systems participate is implemented.

Figure 7:
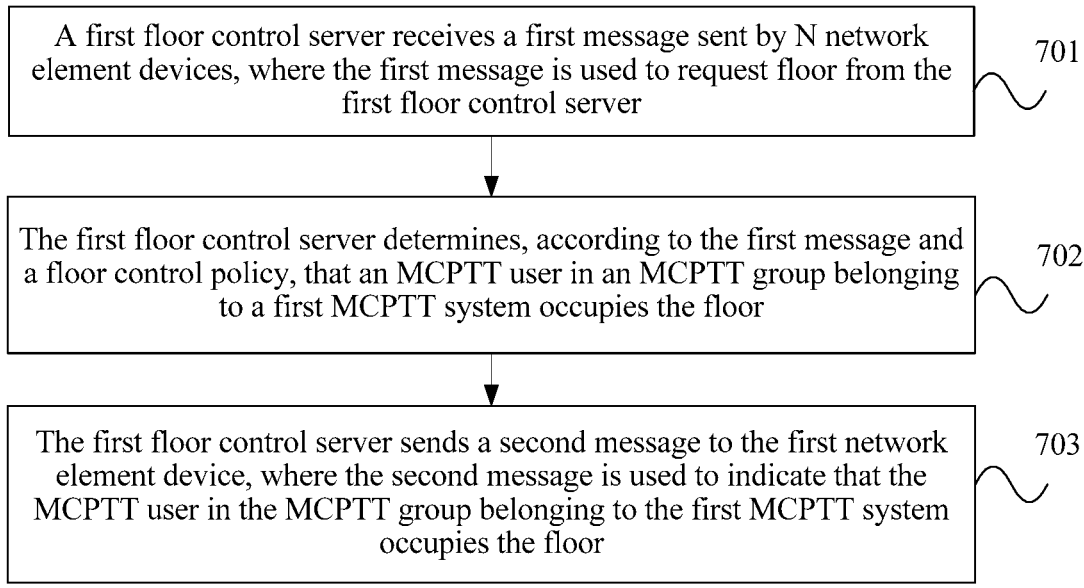
FIG. 7 is a flowchart of Embodiment 5 of a method for floor control on multiple MCPTT systems according to the present application.

FIG. 7 is a flowchart of Embodiment 5 of a method for floor control on multiple MCPTT systems according to the present application. This embodiment is applied to the application scenario shown in FIG. 2. As shown in FIG. 7, the method in this embodiment may include the following steps.

Step 701: A first floor control server receives a first message sent by N network element devices, where the first message is used to request floor from the first floor control server.

N is an integer greater than or equal to 1, and the N network element devices respectively belong to N MCPTT systems.

The network element device may be a floor control server or a media server.

It should be noted that a network element device in an embodiment related to FIG. 2 is a network element device in an MCPTT system to which an MCPTT group belongs.

Step 702: The first floor control server determines, according to the first message and a floor control policy, that an MCPTT user in an MCPTT group belonging to a first MCPTT system occupies the floor.

The first MCPTT system is an MCPTT system to which a first network element device belongs, and the first network element device is a network element device in the N network element devices.

Optionally, the first network element device is a second floor control server or a second media server.

Optionally, the floor control policy may be a policy based on a sequence of receiving a message. For example, if the first floor control server first receives a first message sent by a network element device A and then receives a first message sent by a network element device B, the first floor control server sends a second message to the network element device A. That is, the network element device A is the first network element device.

Step 703: The first floor control server sends a second message to the first network element device, where the second message is used to indicate that the MCPTT user in the MCPTT group belonging to the first MCPTT system occupies the floor.

In this embodiment, after receiving a first message sent by N network element devices, a first floor control server determines, according to the first message sent by the N network element devices and a floor control policy, to send a second message to a first network element device in the N network element devices, where the second message is used for an MCPTT user in an MCPTT group belonging to a first MCPTT system to occupy floor, and the first MCPTT system is an MCPTT system to which the first network element device belongs. Therefore, a first floor control server in an MCPTT system to which an MCPTT group in multiple MCPTT groups participating in a current group call session belongs can manage floor of an MCPTT user in an MCPTT group belonging to another MCPTT system, so that floor control in a group session in which multiple MCPTT systems participate is implemented.

Optionally, after step 702, the method may further include: sending, by the first floor control server, a third message to another network element device, where the other network element device is a device, except the first network element device, in the N network element devices.

The third message is used to indicate that floor occupation of an MCPTT user in an MCPTT group belonging to a third MCPTT system is rejected, or the third message includes queue information, where the queue information is used to indicate queuing of floor occupied by an MCPTT user in an MCPTT group belonging to the third MCPTT system, and the third MCPTT system is an MCPTT group to which the another network element device belongs.

Figure 8:
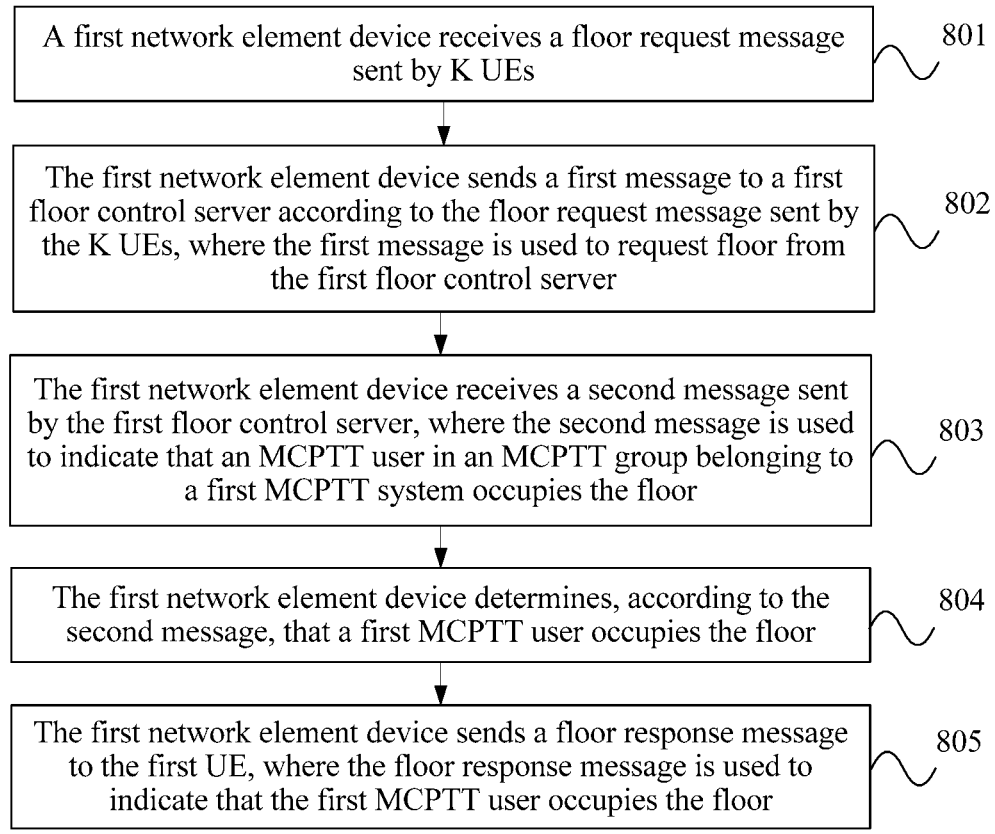
FIG. 8 is a flowchart of Embodiment 6 of a method for floor control on multiple MCPTT systems according to the present application.

FIG. 8 is a flowchart of Embodiment 6 of a method for floor control on multiple MCPTT systems according to the present application. This embodiment is applied to the application scenario shown in FIG. 2. As shown in FIG. 8, the method in this embodiment may include the following steps.

Step 801: A first network element device receives a floor request message sent by K UEs.

K is an integer greater than or equal to 1, the first network element device belongs to a first MCPTT system, K MCPTT users are respectively associated with the K UEs, and MCPTT groups to which the K MCPTT users respectively belong, belong to the first MCPTT system.

Optionally, the first network element device is a second floor control server or a second media server.

Step 802: The first network element device sends a first message to a first floor control server according to the floor request message sent by the K UEs, where the first message is used to request floor from the first floor control server.

Step 803: The first network element device receives a second message sent by the first floor control server, where the second message is used to indicate that an MCPTT user in an MCPTT group belonging to a first MCPTT system occupies the floor.

Step 804: The first network element device determines, according to the second message, that a first MCPTT user occupies the floor.

The first MCPTT user is an associated user of first UE, and the first UE is UE in the N UEs.

Step 805: The first network element device sends a floor response message to the first UE, where the floor response message is used to indicate that the first MCPTT user occupies the floor.

In this embodiment, after receiving a floor request message sent by K UEs, a first network element device sends a first message to a first floor control server according to the floor request message sent by the K UEs, where the first message is used to request floor from the first floor control server; receives a second message sent by the first floor control server, where the second message is used to indicate that an MCPTT user in an MCPTT group belong to the first MCPTT system occupies the floor; and sends a floor response message to first UE according to the second message, where the floor response message is used to indicate that a first MCPTT user occupies the floor, and the first MCPTT system is an MCPTT system to which the first network element device belongs. Therefore, a first floor control server in an MCPTT system to which an MCPTT group in multiple MCPTT groups participating in a current group call session belongs can manage floor of an MCPTT user in an MCPTT group belonging to another MCPTT system, so that floor control in a group session in which multiple MCPTT systems participate is implemented.

Figure 9:
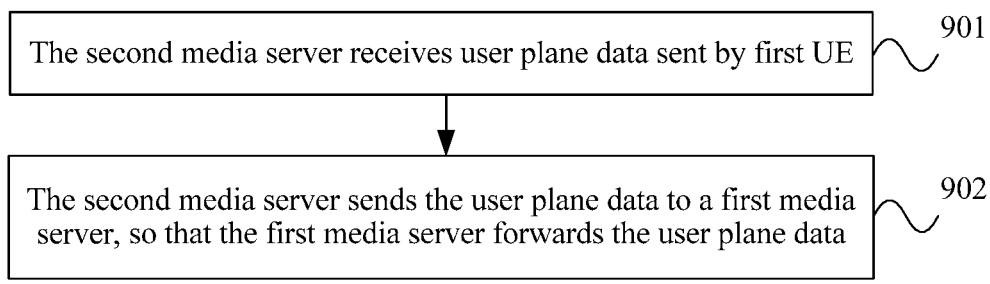
FIG. 9 is a flowchart of Embodiment 7 of a method for floor control on multiple MCPTT systems according to the present application.

FIG. 9 is a flowchart of Embodiment 7 of a method for floor control on multiple MCPTT systems according to the present application. As shown in FIG. 9, based on the embodiments shown in FIG. 7 and FIG. 8, this embodiment may further include the following steps.

Step 901: The second media server receives user plane data sent by the first UE.

Step 902: The second media server sends the user plane data to a first media server, so that the first media server forwards the user plane data.

A MCPTT system to which the first floor control server belongs includes the first media server.

In this embodiment of the present application, after receiving user plane data sent by the first UE, a second media server sends the user plane data to a first media server, so that the first media server forwards the user plane data. Therefore, after an MCPTT user, belonging to an MCPTT system of the second media server, in one or more MCPTT groups participating in a current group call session obtains floor, the MCPTT user can forward user plane data (for example, speech content) by using the first media server to an MCPTT user in another MCPTT group, so that transmission of user plane data in a group call in which multiple MCPTT systems participate is implemented an MCPTT user in another MCPTT group, so that transmission of user plane data in a group call in which multiple MCPTT systems participate is implemented.

Figure 10:
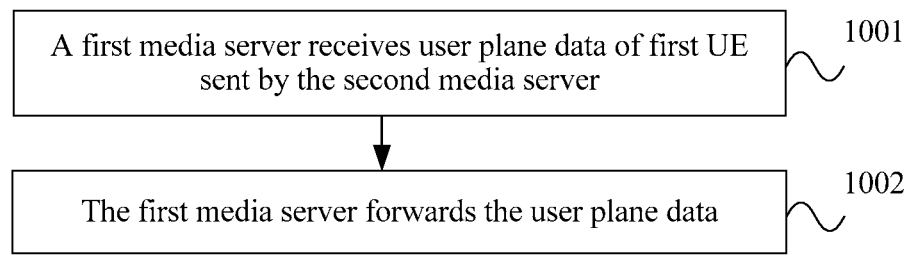
FIG. 10 is a flowchart of Embodiment 8 of a method for floor control on multiple MCPTT systems according to the present application.

FIG. 10 is a flowchart of Embodiment 8 of a method for floor control on multiple MCPTT systems according to the present application. As shown in FIG. 10, based on the embodiments shown in FIG. 7 and FIG. 8, this embodiment may further include the following steps.

Step 1001: A first media server receives user plane data of the first UE sent by the second media server.

A MCPTT system to which the first floor control server belongs includes the first media server.

Step 1002: The first media server forwards the user plane data.

In this embodiment of the present application, after receiving user plane data of the first UE sent by a second media server, a first media server forwards the user plane data, so that user plane data (for example, speech content) generated after an MCPTT user in an MCPTT group participating in a current group call session obtains floor can be forwarded by using the first media server to an MCPTT user in another MCPTT group, so that transmission of user plane data in a group call in which multiple MCPTT systems participate is implemented an MCPTT user in another MCPTT group, so that transmission of user plane data in a group call in which multiple MCPTT systems participate is implemented.

Optionally, the forwarding, by the first media server, the user plane data includes sending, by the first media server, the user plane data to second UE, where an associated user of the second UE is an MCPTT user in an MCPTT group belonging to the MCPTT system to which the first floor control server belongs.

Optionally, when an MCPTT system to which the second UE belongs is different from the MCPTT system to which the first floor control server belongs, the sending, by the first media server, the user plane data to second UE includes: sending, by the first media server, the user plane data directly to the second UE; or sending, by the first media server, the user plane data by using a third media server to the second UE.

The MCPTT system to which the second UE belongs includes the third media server.

Optionally, the forwarding, by the first media server, the user plane data further includes sending, by the first media server, the user plane data to a fourth media server, so that the fourth media server forwards the user plane data to third UE.

An associated user of the third UE is an MCPTT user in an MCPTT group belonging to a second MCPTT system, and the second MCPTT system includes the fourth media server.

Figure 11:
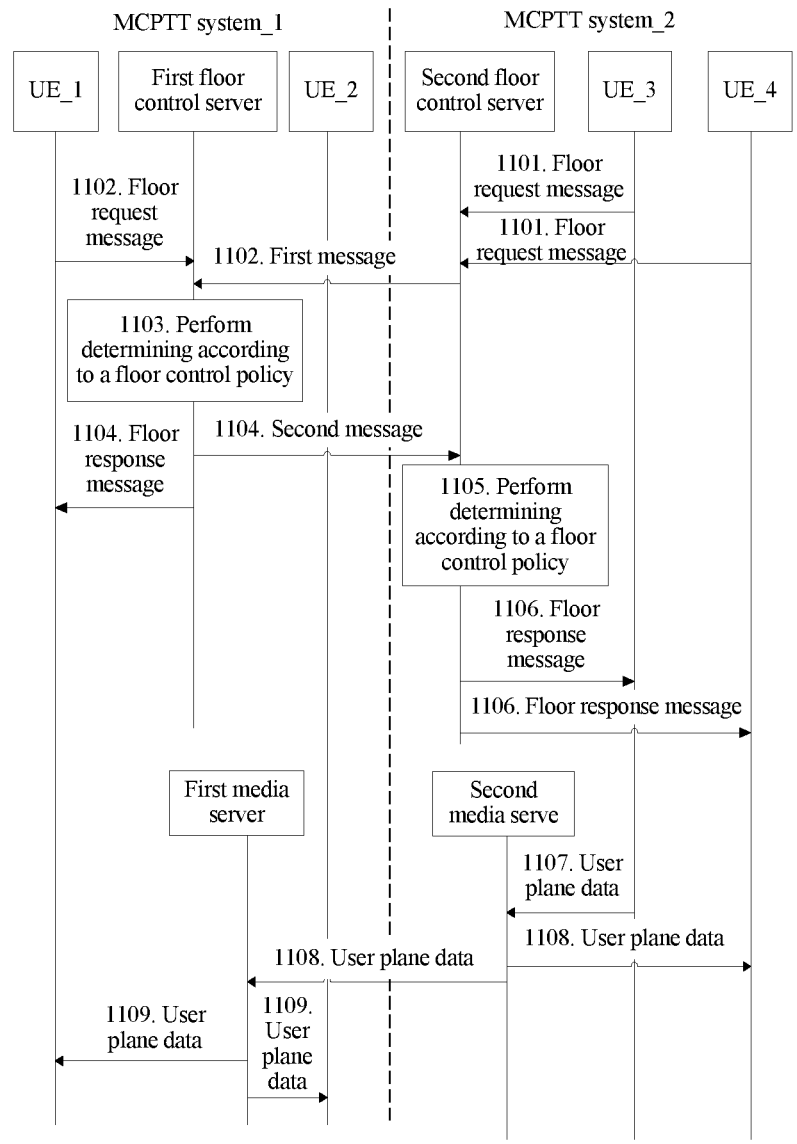
FIG. 11 is a flowchart of Embodiment 9 of a method for floor control on multiple MCPTT systems according to the present application.

FIG. 11 is a flowchart of Embodiment 9 of a method for floor control on multiple MCPTT systems according to the present application. This embodiment is applied to the application scenario shown in FIG. 2. As shown in FIG. 11, this embodiment may include the following steps.

Step 1101: A second floor control server receives a floor request message sent by UE_3 and UE_4.

An associated user of the UE_3 is a MCPTT_User3, and an associated user of the UE_4 is a MCPTT_User4. MCPTT groups, to which the MCPTT_User3 and the MCPTT_User4 respectively belong, belong to an MCPTT system_2. The second floor control server belongs to the MCPTT system_2.

It should be noted that a time point at which the second floor control server receives a floor request message sent by the UE_3 and a time point at which the second floor control server receives a floor request message sent by the UE_4 may be a time point in a preset time window or may be a same time point.

Step 1102: A first floor control server receives a first message sent by the second floor control server and a floor request message sent by UE_1.

The first message may be determined by the second floor control server according to the floor request message sent by the UE_3 and the UE_4, where the first message may include group information of the MCPTT groups to which the MCPTT_User3 and the MCPTT_User4 respectively belong.

Optionally, the group information includes a group identifier and/or a group priority.

An associated user of the UE_1 is a MCPTT_User1, and an associated user of UE_2 is a MCPTT_User2. MCPTT groups, to which the MCPTT_User1 and the MCPTT_User2 respectively belong, belong to an MCPTT system_1. The first floor control server belongs to the MCPTT system_1.

It should be noted that a time point at which the first floor control server receives the floor request message sent by the UE_1 and a time point at which the first floor control server receives the first message sent by the second floor control server may be a time point in a preset time window or may be a same time point.

Step 1103: The first floor control server determines, according to the first message sent by the second floor control server, the floor request message sent by the UE_1, and a floor control policy, that an MCPTT user in a first MCPTT group belonging to an MCPTT system_2 occupies floor.

The first MCPTT group is a group to which the MCPTT_User3 belongs.

Optionally, the floor control policy in step 1103 may be a policy based on a group priority.

The determining, by the first floor control server according to the first message sent by the second floor control server, the floor request message sent by the UE_1, and a floor control policy, that an MCPTT user in a first MCPTT group belonging to an MCPTT system_2 occupies floor includes: determining, by the first floor control server according to the floor request message sent by the UE_1, group information of an MCPTT group to which the MCPTT_user1 requesting the floor from the first floor control server belongs; and determining, by the first floor control server according to the first message sent by the second floor control server, the group information of the MCPTT group to which the MCPTT_user1 belongs, and the floor control policy, that the MCPTT user in the first MCPTT group belonging to the MCPTT system_2 occupies the floor.

Step 1104: The first floor control server sends a second message to the second floor control server, and sends a floor response message to the UE_1.

The second message is used to indicate that the MCPTT user in the first MCPTT group belonging to the MCPTT system_2 occupies the floor, and the floor response message sent to the UE_1 is used to indicate that floor occupation of the MCPTT_user1 is rejected.

It should be noted that there is no sequence between the sending, by the first floor control server, the second message to the second floor control server and the sending, by the first floor control server, the floor response message to the UE_1.

Step 1105: The second floor control server determines, according to the second message and a floor control policy, that a MCPTT_user3 occupies the floor.

Optionally, the floor control policy in step 1105 may be a policy based on a sequence of receiving a floor request message, or a policy based on a user priority.

For example, when the floor control policy is the policy based on a sequence of receiving a floor request message, the MCPTT_user3 and MCPTT_user4 both belong to the first MCPTT group. When a time at which the second floor control server receives the floor request message sent by the UE_3 is earlier than a time at which the floor request message sent by the UE_4 is received, it is determined that the MCPTT_user3 occupies the floor.

For example, when the floor control policy is the policy based on a user priority, the MCPTT_user3 and MCPTT_user4 both belong to the first MCPTT group, and a priority of the MCPTT_user3 is higher than a priority of the MCPTT_user4, it is determined that the MCPTT_user3 occupies the floor.

Step 1106: The second floor control server sends a floor response message to the UE_3 and the UE_4.

The floor response message sent to the UE_3 is used to indicate that the MCPTT_user3 occupies the floor, and the floor response message sent to the UE_4 is used to indicate that floor occupation of the MCPTT_user4 is rejected.

It should be noted that there is no sequence between the sending, by the second floor control server, the floor response message to the UE_3 and the sending, by the second floor control server, the floor response message to the UE_4.

Step 1107: A second media server receives user plane data sent by the UE_3.

The second media server belongs to the MCPTT system_2.

Step 1108: The second media server sends the user plane data to the UE_4 and a first media server.

The first media server belongs to the MCPTT system_1.

Step 1109: The first media server sends the user plane data to the UE_1 and the UE_2.

It should be noted that in this embodiment, there are two MCPTT systems included in the multiple MCPTT systems, there are two UEs in the MCPTT system_2 that request the floor from the second floor control server, and there is one UE in the MCPTT system_1 that requests the floor from the first floor control server. This is merely exemplary.

In this embodiment, a first floor control server determines, according to a first message (the first message includes group information of MCPTT groups to which an MCPTT_User3 and an MCPTT_User4 respectively belong) sent by a second floor control server, a floor request message sent by UE_1, and a floor control policy, that an MCPTT user in a first MCPTT group belonging to an MCPTT system_2 occupies floor. The second floor control server receives a second message that is sent by the first floor control server and used to indicate that the MCPTT user in the first MCPTT group belonging to the MCPTT system_2 occupies the floor, and determines, according to the second message and a floor control policy, that the MCPTT_User3 occupies the floor, so that floor control in a group session in which multiple MCPTT systems participate is implemented. Further, a second media server receives user plane data sent by UE_3, and sends the user plane data to a first media server, and the first media server forwards the user plane data to the UE_1 and UE_2, so that transmission of user plane data in a group call in which multiple MCPTT systems participate is implemented.

Figure 12:
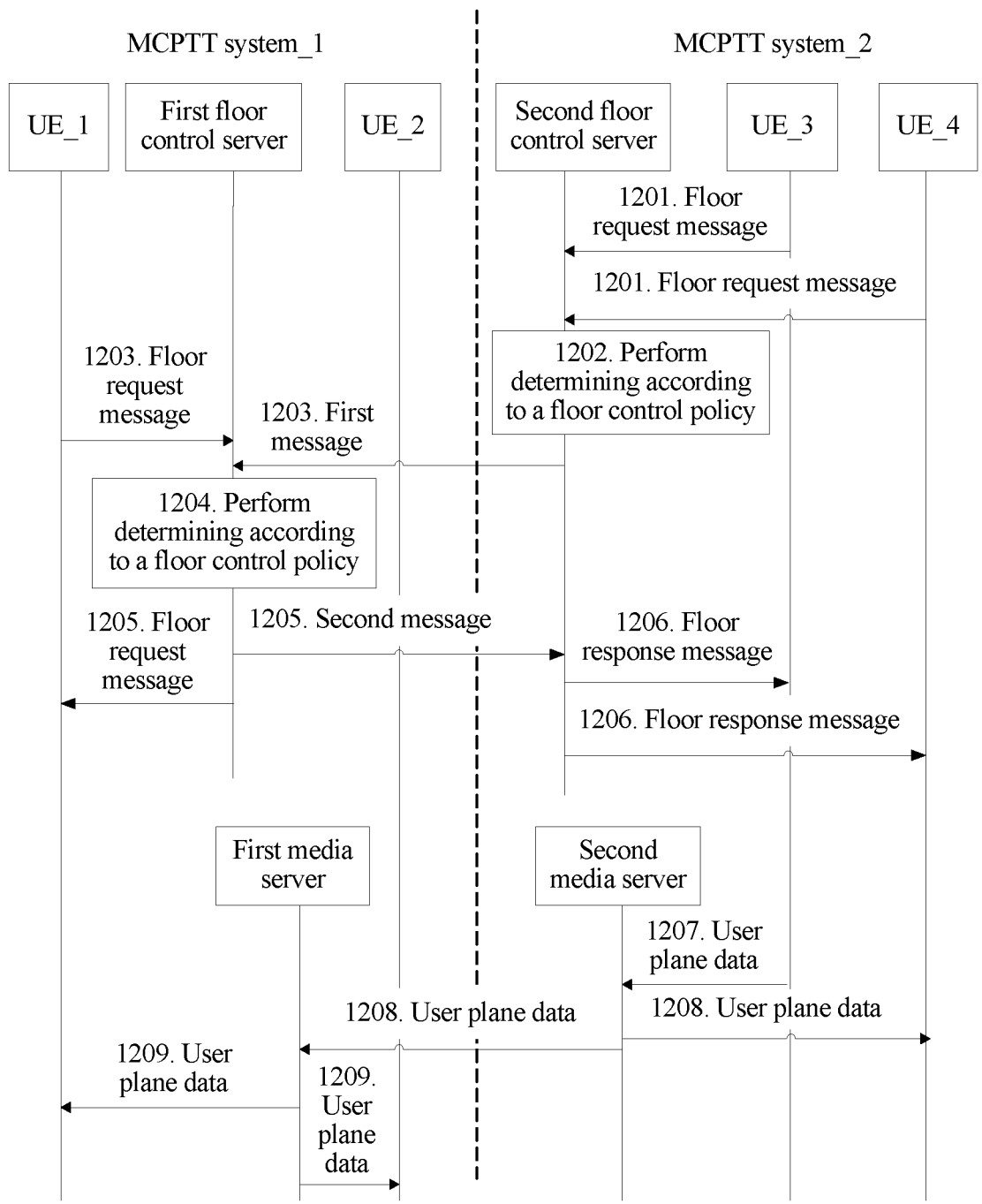
FIG. 12 is a flowchart of Embodiment 10 of a method for floor control on multiple MCPTT systems according to the present application.

FIG. 12 is a flowchart of Embodiment 10 of a method for floor control on multiple MCPTT systems according to the present application. This embodiment is applied to the application scenario shown in FIG. 2. As shown in FIG. 12, this embodiment may include the following steps.

Step 1201: A second floor control server receives a floor request message sent by UE_3 and UE_4.

It should be noted that step 1201 is similar to step 1101, and details are not described herein.

Step 1202: The second floor control server determines a first message according to the floor request message sent by the UE_3 and the UE_4 and a floor control policy.

The first message includes user information of a MCPTT_user3 requesting floor from the second floor control server, where the MCPTT_user3 is an associated user of the UE_3.

Optionally, the user information includes at least one of the following: a user identifier, a user role, or user priority information.

Optionally, the floor control policy in step 1202 may be a policy based on a sequence of receiving a message, a policy based on a user priority, or the like.

Step 1203: A first floor control server receives the first message sent by the second floor control server and a floor request message sent by UE_1.

It should be noted that step 1203 is similar to step 1102, and details are not described herein.

Step 1204: The first floor control server determines, according to the first message sent by the second floor control server, the floor request message sent by the UE_1, and a floor control policy, that a MCPTT_user3 in an MCPTT group belonging to an MCPTT system_2 occupies floor.

Optionally, the floor control policy in step 1204 may be a policy based on a user priority.

Optionally, the first floor control server may determine, according to the user identifier included in the first message, a user role corresponding to the user identifier, and further determines the user priority.

Step 1205: The first floor control server sends a second message to the second floor control server, and sends a floor response message to the UE_1.

The second message is used to indicate that the MCPTT_user3 in the MCPTT group belonging to the MCPTT system_2 occupies the floor, and the floor response message sent to the UE_1 is used to indicate that floor occupation of a MCPTT_user1 is rejected.

It should be noted that there is no sequence between the sending, by the first floor control server, the second message to the second floor control server and the sending, by the first floor control server, the floor response message to the UE_1.

Step 1206: The second floor control server determines, according to the second message, that the MCPTT_user3 occupies the floor, and sends a floor response message to the UE_3 and the UE_4.

The floor response message sent to the UE_3 is used to indicate that the MCPTT_user3 occupies the floor, and the floor response message sent to the UE_4 is used to indicate that floor occupation of a MCPTT_user4 is rejected.

It should be noted that there is no sequence between the sending, by the second floor control server, the floor response message to the UE_3 and the sending, by the first network element device, the floor response message to the UE_4.

Step 1207: A second media server receives user plane data sent by the UE_3.

Step 1208: The second media server sends the user plane data to the UE_4 and a first media server.

Step 1209: The first media server sends the user plane data to the UE_1 and UE_2.

It should be noted that steps 1207 to 1209 are respectively similar to steps 1107 to 1109, and details are not described herein.

In this embodiment, a first floor control server determines, according to a first message (the first message includes user information of an MCPTT_User3) sent by a second floor control server, a floor request message sent by UE_1, and a floor control policy, that an MCPTT_User3 in an MCPTT group belonging to an MCPTT system_2 occupies floor. The second floor control server receives a second message that is sent by the first floor control server and used to indicate that the MCPTT_User3 in the MCPTT group belonging to the MCPTT system_2 occupies the floor, and determines, according to the second message, that the MCPTT_User3 occupies the floor, so that floor control in a group session in which multiple MCPTT systems participate is implemented. Further, a second media server receives user plane data sent by UE_3, and sends the user plane data to a first media server, and the first media server forwards the user plane data to the UE_1 and UE_2, so that transmission of user plane data in a group call in which multiple MCPTT systems participate is implemented.

Figure 13:
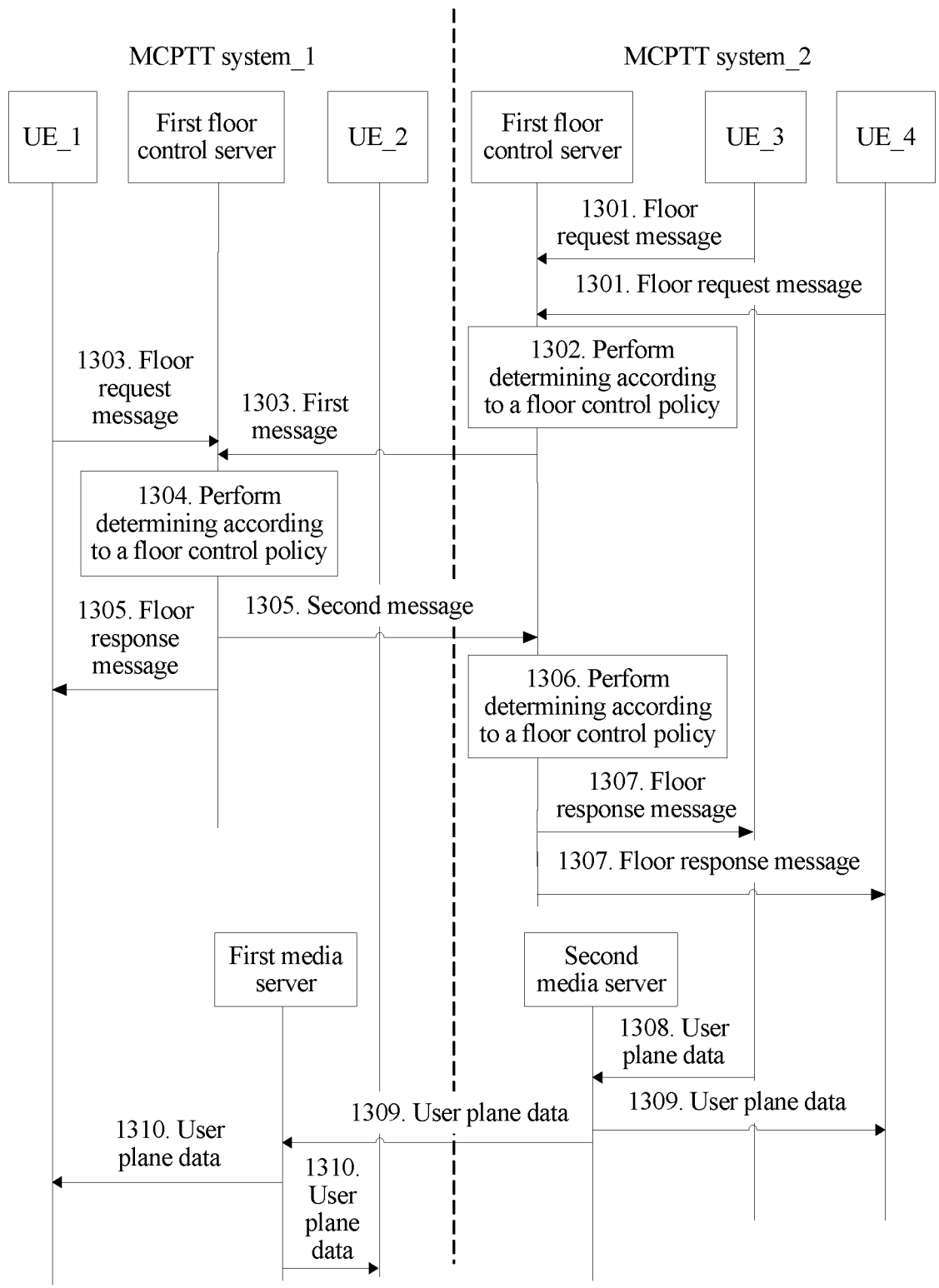
FIG. 13 is a flowchart of Embodiment 11 of a method for floor control on multiple MCPTT systems according to the present application.

FIG. 13 is a flowchart of Embodiment 11 of a method for floor control on multiple MCPTT systems according to the present application. This embodiment is applied to the application scenario shown in FIG. 2. As shown in FIG. 13, this embodiment may include the following steps.

Step 1301: A second floor control server receives a floor request message sent by UE_3 and UE_4.

It should be noted that step 1301 is similar to step 1201, and details are not described herein.

Step 1302: The second floor control server determines a first message according to the floor request message sent by the UE_3 and the UE_4 and a floor control policy.

The first message includes group information of a first MCPTT group in MCPTT groups to which a MCPTT_user3 and a MCPTT_user4 requesting floor from the second floor control server respectively belong. The MCPTT_user3 is an associated user of the UE_3, and the MCPTT_user4 is an associated user of the UE_4. The first MCPTT group is a group to which the MCPTT_user3 belongs.

Optionally, the group information includes a group identifier and/or a group priority.

Optionally, the floor control policy in step 1302 may be a policy based on a sequence of receiving a message, a policy based on a group priority, or the like.

Step 1303: A first floor control server receives the first message sent by the second floor control server and a floor request message sent by UE_1.

It should be noted that step 1303 is similar to step 1202, and details are not described herein.

Step 1304: The first floor control server determines, according to the first message sent by the second floor control server, the floor request message sent by the UE_1, and a floor control policy, that an MCPTT user in a first MCPTT group belonging to an MCPTT system_2 occupies floor.

Optionally, the floor control policy in step 1304 may be a policy based on a group priority.

Step 1305: The first floor control server sends a second message to the second floor control server, and sends a floor response message to the UE_1.

The second message is used to indicate that the MCPTT user in the first MCPTT group belonging to the MCPTT system_2 occupies the floor, and the floor response message sent to the UE_1 is used to indicate that floor occupation of a MCPTT_user1 is rejected.

It should be noted that there is no sequence between the sending, by the first floor control server, the second message to the second floor control server and the sending, by the first floor control server, the floor response message to the UE_1.

Step 1306: The second floor control server determines, according to the second message and a floor control policy, that a MCPTT_user3 occupies the floor.

Optionally, the floor control policy in step 1306 may be a policy based on a sequence of receiving a message, a policy based on a user priority, or the like.

Step 1307: The second floor control server sends a floor response message to the UE_3 and the UE_4.

The floor response message sent to the UE_3 is used to indicate that the MCPTT_user3 occupies the floor, and the floor response message sent to the UE_4 is used to indicate that floor occupation of the MCPTT_user4 is rejected.

It should be noted that there is no sequence between the sending, by the second floor control server, the floor response message to the UE_3 and the sending, by the first network element device, the floor response message to the UE_4.

Step 1308: A second media server receives user plane data sent by the UE_3.

Step 1309: The second media server sends the user plane data to the UE_4 and a first media server.

Step 1310: The first media server sends the user plane data to the UE_1 and UE_2.

It should be noted that steps 1308 to 1310 are respectively similar to steps 1207 to 1209, and details are not described herein.

In this embodiment, a first floor control server determines, according to a first message (the first message includes group information of a first MCPTT group) sent by a second floor control server, a floor request message sent by UE_1, and a floor control policy, that an MCPTT user in a first MCPTT group belonging to an MCPTT system_2 occupies floor. The second floor control server receives a second message that is sent by the first floor control server and used to indicate that the MCPTT user in the first MCPTT group belonging to the MCPTT system_2 occupies the floor, and determines, according to the second message and a floor control policy, that an MCPTT_User3 occupies the floor, so that floor control in a group session in which multiple MCPTT systems participate is implemented. Further, a second media server receives user plane data sent by UE_3, and sends the user plane data to a first media server, and the first media server forwards the user plane data to the UE_1 and UE_2, so that transmission of user plane data in a group call in which multiple MCPTT systems participate is implemented.

Figure 14:
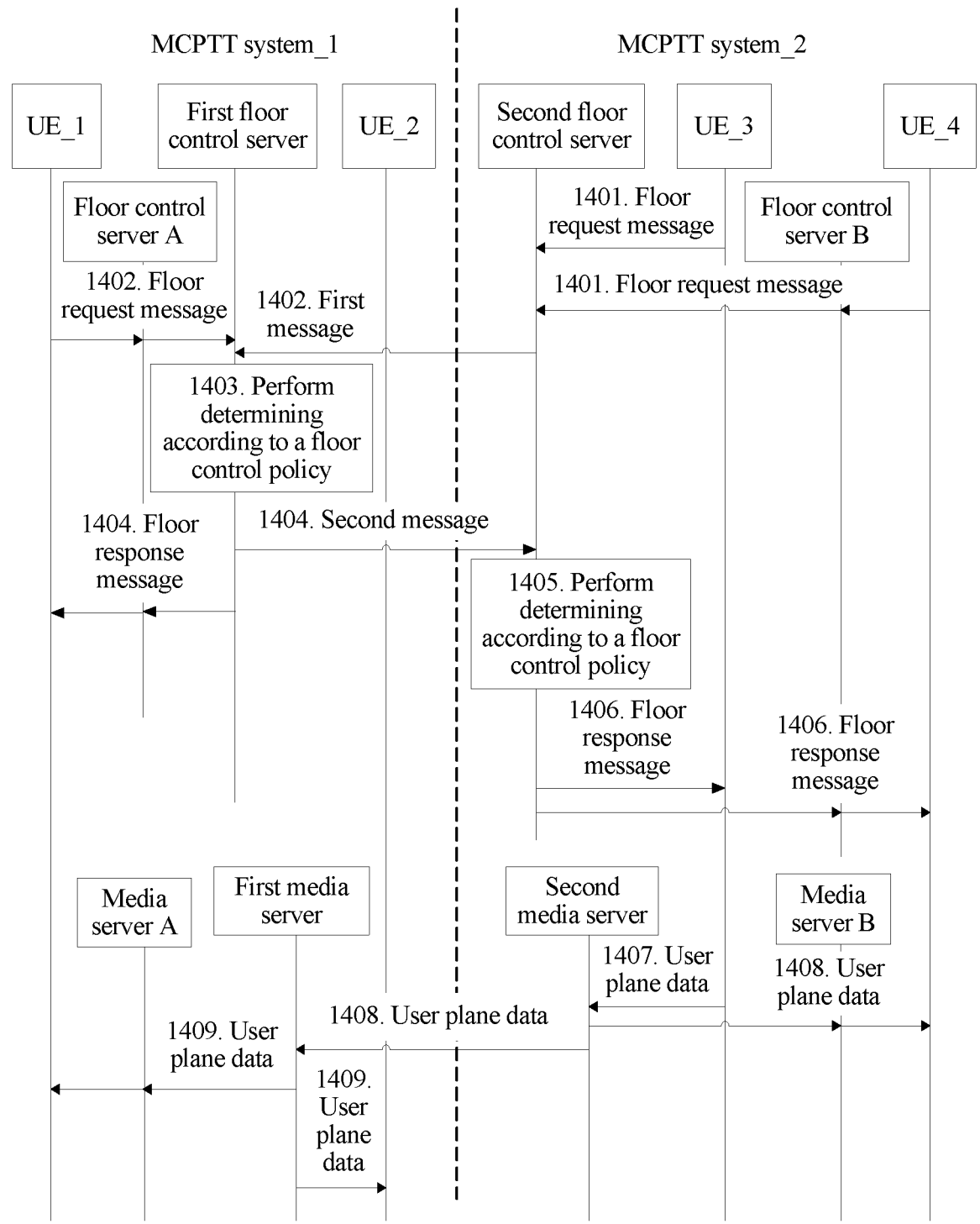
FIG. 14 is a flowchart of Embodiment 12 of a method for floor control on multiple MCPTT systems according to the present application.

FIG. 14 is a flowchart of Embodiment 12 of a method for floor control on multiple MCPTT systems according to the present application. This embodiment is applied to the application scenario shown in FIG. 2. As shown in FIG. 14, this embodiment may include the following steps.

Step 1401: A second floor control server receives a floor request message sent by UE_3 and UE_4.

An associated user of the UE_3 is a MCPTT_user3, and an associated user of the UE_4 is a MCPTT_user4. A MCPTT system to which the MCPTT_user3 belongs is an MCPTT system2, and an MCPTT system to which the MCPTT_user4 belongs is an MCPTT system_3.

Optionally, the receiving, by a second floor control server, a floor request message sent by UE_4 specifically includes: receiving, by the second floor control server, the floor request message that is sent by the UE_4 directly to the second floor control server; or receiving, by the second floor control server, the floor request message that is sent by the UE_4 by using a floor control server B to the second floor control server.

The floor control server B belongs to the MCPTT system_3.

Step 1402: A first floor control server receives a first message sent by the second floor control server and a floor request message sent by UE_1.

An associated user of the UE_1 is a MCPTT_user1, and an MCPTT system to which the MCPTT_user1 belongs is an MCPTT system_4.

Optionally, the receiving, by the first floor control server, the floor request message sent by the UE_1 specifically includes: receiving, by the first floor control server, the floor request message that is sent by the UE_1 directly to the first floor control server; or receiving, by the first floor control server, the floor request message that is sent by the UE_1 by using a floor control server A to the first floor control server.

The floor control server A belongs to the MCPTT system_4.

Step 1403: The first floor control server determines, according to the first message sent by the second floor control server, the floor request message sent by the UE_1, and a floor control policy, that an MCPTT user in a first MCPTT group belonging to an MCPTT system_2 occupies floor.

It should be noted that step 1403 is similar to step 1103, and details are not described herein.

Step 1404: The first floor control server sends a second message to the second floor control server, and sends a floor response message to the UE_1.

The sending, by the first floor control server, a floor response message to the UE_1 specifically includes: sending, by the first floor control server, the floor response message directly to the UE_1; or sending, by the first floor control server, the floor response message by using the floor control server A to the UE_1.

Step 1405: The second floor control server determines, according to the second message and a floor control policy, that a MCPTT_user3 occupies the floor.

It should be noted that step 1405 is similar to step 1105, and details are not described herein.

Step 1406: The second floor control server sends a floor response message to the UE_3 and the UE_4.

The floor response message sent to the UE_3 is used to indicate that the MCPTT_user3 occupies the floor, and the floor response message sent to the UE_4 is used to indicate that floor occupation of the MCPTT_user4 is rejected.

Optionally, the sending, by the second floor control server, a floor response message to the UE_4 specifically includes: sending, by the second floor control server, the floor response message directly to the UE_4; or sending, by the second floor control server, the floor response message by using the floor control server B to the UE_4.

Step 1407: A second media server receives user plane data sent by the UE_3.

It should be noted that step 1407 is similar to step 1107, and details are not described herein.

Step 1408: The second media server sends the user plane data to the UE_4 and a first media server.

Optionally, the sending, by the second media server, user plane data to the UE_4 specifically includes: sending, by the second media server, the user plane data directly to the UE_4; or sending, by the second media server, the user plane data by using a media server B to the UE_4.

The media server B belongs to the MCPTT system_3.

Step 1409: The first media server sends the user plane data to the UE_1 and UE_2.

Optionally, the sending, by the first media server, the user plane data to the UE_1 specifically includes: sending, by the first media server, the user plane data directly to the UE_1; or sending, by the first media server, the user plane data by using a media server A to the UE_1.

The media server A belongs to the MCPTT system_4.

In this embodiment based on the embodiment shown in FIG. 11, when an MCPTT system to which a UE belongs is different from an MCPTT system to which an MCPTT group to which the UE belongs, belongs a floor control server and a media server in the MCPTT system to which the UE belongs separately forward data of the UE, so that the MCPTT system to which the UE belongs can obtain data receiving and sending statuses of the UE.

Figure 15:
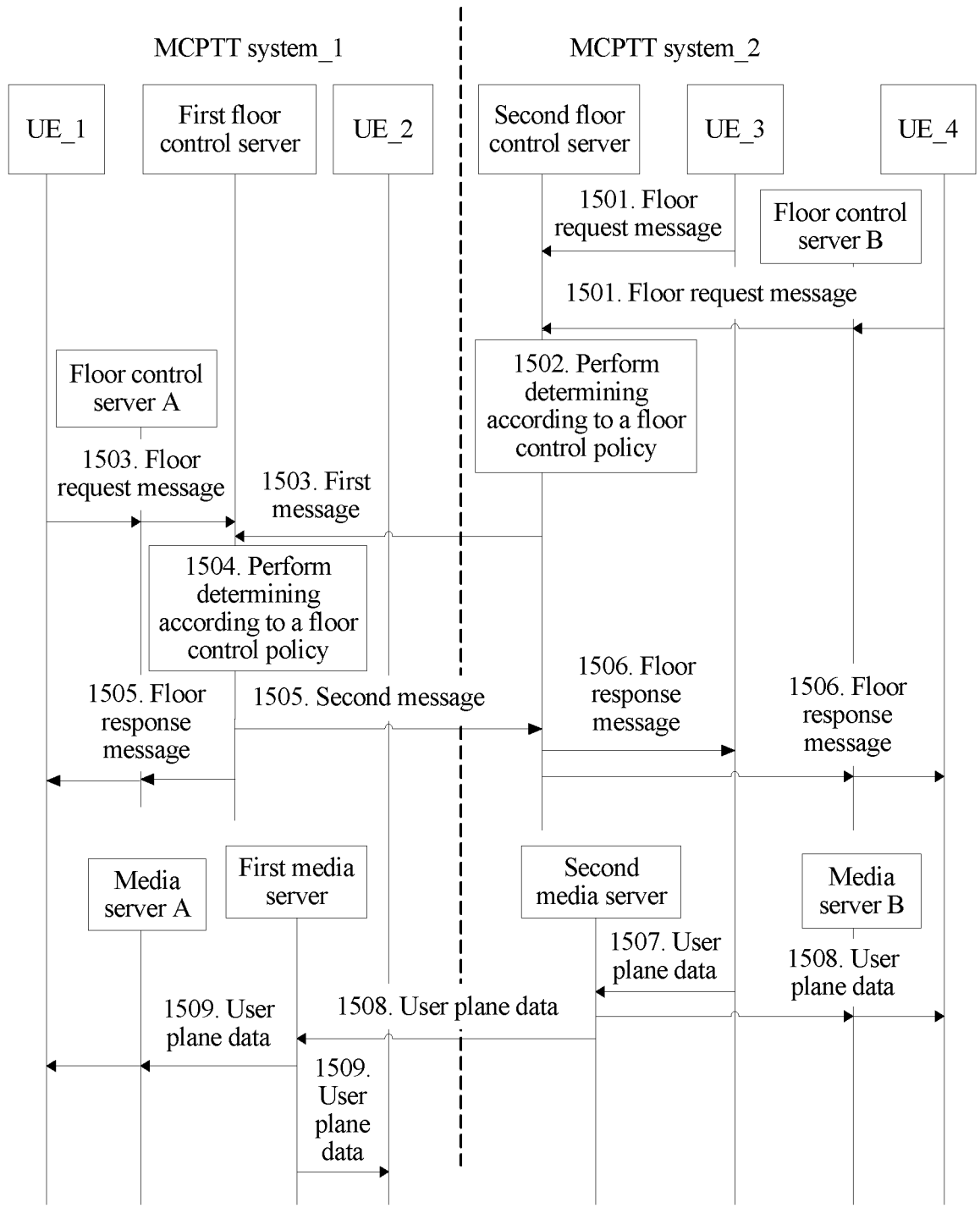
FIG. 15 is a flowchart of Embodiment 13 of a method for floor control on multiple MCPTT systems according to the present application.

FIG. 15 is a flowchart of Embodiment 13 of a method for floor control on multiple MCPTT systems according to the present application. This embodiment is applied to the application scenario shown in FIG. 2. As shown in FIG. 15, this embodiment may include the following steps.

Step 1501: A second floor control server receives a floor request message sent by UE_3 and UE_4.

An associated user of the UE_3 is a MCPTT_user3, and an associated user of the UE_4 is a MCPTT_user4. A MCPTT system to which the MCPTT_user3 belongs is an MCPTT system2, and an MCPTT system to which the MCPTT_user4 belongs is an MCPTT system_3.

Optionally, the receiving, by a second floor control server, a floor request message sent by UE_4 specifically includes: receiving, by the second floor control server, the floor request message that is sent by the UE_4 directly to the second floor control server; or receiving, by the second floor control server, the floor request message that is sent by the UE_4 by using a floor control server B to the second floor control server.

The floor control server B belongs to the MCPTT system_3.

Step 1502: The second floor control server determines a first message according to the floor request message sent by the UE_3 and the UE_4 and a floor control policy.

It should be noted that step 1502 is similar to step 1202, and details are not described herein.

Step 1503: A first floor control server receives a first message sent by the second floor control server and a floor request message sent by UE_1.

An associated user of the UE_1 is a MCPTT_user1, and an MCPTT system to which the MCPTT_user1 belongs is an MCPTT system_4.

Optionally, the receiving, by the first floor control server, the floor request message sent by the UE_1 specifically includes: receiving, by the first floor control server, the floor request message that is sent by the UE_1 directly to the first floor control server; or receiving, by the first floor control server, the floor request message that is sent by the UE_1 by using a floor control server A to the first floor control server.

The floor control server A belongs to the MCPTT system_4.

Step 1504: The first floor control server determines, according to the first message sent by the second floor control server, the floor request message sent by the UE_1, and a floor control policy, that a MCPTT_user3 in an MCPTT group belonging to an MCPTT system_2 occupies floor.

It should be noted that step 1504 is similar to step 1204, and details are not described herein.

Step 1505: The first floor control server sends a second message to the second floor control server, and sends a floor response message to the UE_1.

The second message is used to indicate that the MCPTT_user3 in the MCPTT group belonging to the MCPTT system_2 occupies the floor, and the floor response message sent to the UE_1 is used to indicate that floor occupation of the MCPTT_user1 is rejected.

Optionally, the sending, by the first floor control server, a floor response message to the UE_1 specifically includes: sending, by the first floor control server, the floor response message directly to the UE_1; or sending, by the first floor control server, the floor response message by using the floor control server A to the UE_1.

Step 1506: The second floor control server determines, according to the second message, that the MCPTT_user3 occupies the floor, and sends a floor response message to the UE_3 and the UE_4.

Optionally, the sending, by the second floor control server, the floor response message to the UE_4 specifically includes: sending, by the second floor control server, the floor response message directly to the UE_4; or sending, by the second floor control server, the floor response message by using the floor control server B to the UE_4.

Step 1507: A second media server receives user plane data sent by the UE_3.

It should be noted that step 1507 is similar to step 1207, and details are not described herein.

Step 1508: The second media server sends the user plane data to the UE_4 and a first media server.

Optionally, the sending, by the second media server, the user plane data to the UE_4 specifically includes: sending, by the second media server, the user plane data directly to the UE_4; or sending, by the second media server, the user plane data by using a media server B to the UE_4.

The media server B belongs to the MCPTT system_3.

Step 1509: The first media server sends the user plane data to the UE_1 and UE_2.

Optionally, the sending, by the first media server, the user plane data to the UE_1 specifically includes: sending, by the first media server, the user plane data directly to the UE_1; or sending, by the first media server, the user plane data by using a media server A to the UE_1.

The media server A belongs to the MCPTT system_4.

In this embodiment based on the embodiment shown in FIG. 12, when an MCPTT system to which a UE belongs is different from an MCPTT system to which an MCPTT group to which the UE belongs, belongs a floor control server and a media server in the MCPTT system to which the UE belongs separately forward data of the UE, so that the MCPTT system to which the UE belongs can obtain data receiving and sending statuses of the UE.

Figure 16:
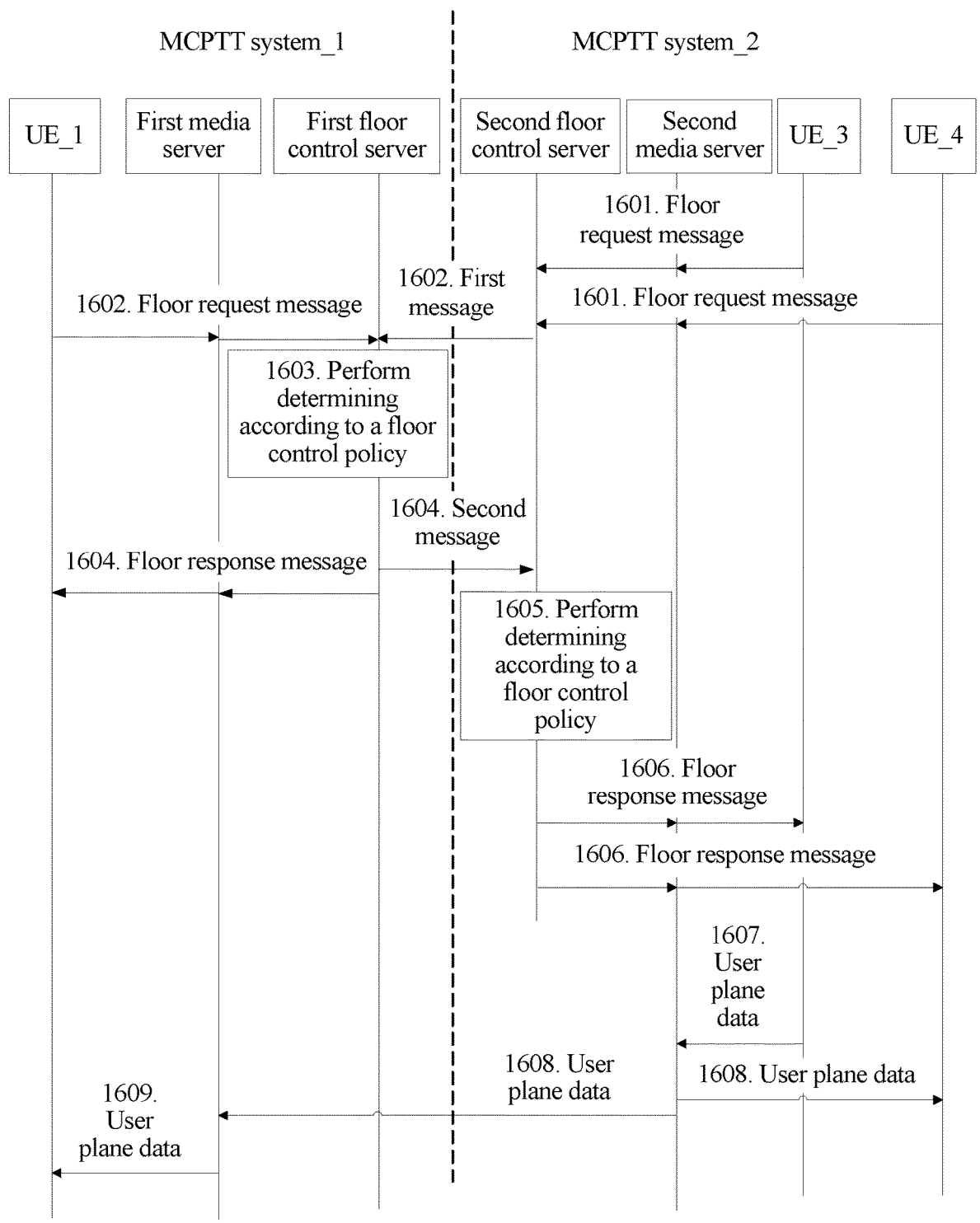
FIG. 16 is a flowchart of Embodiment 14 of a method for floor control on multiple MCPTT systems according to the present application.

FIG. 16 is a flowchart of Embodiment 14 of a method for floor control on multiple MCPTT systems according to the present application. This embodiment is applied to the application scenario shown in FIG. 2. As shown in FIG. 16, this embodiment may include the following steps.

Step 1601: A second floor control server receives a floor request message that is separately sent by UE_3 and UE_4 by using a second media server.

The second media server and the second floor control server belong to an MCPTT system_2. An associated user of the UE_3 is a MCPTT_User3, and an associated user of the UE_4 is a MCPTT_User4. MCPTT groups, to which the MCPTT_User3 and the MCPTT_User4 respectively belong, belong to the MCPTT system_2.

Step 1602: A first floor control server receives a first message sent by the second floor control server and a floor request message that is sent by UE_1 by using a first media server.

The first message may be determined by the second floor control server according to the floor request message sent by the UE_3 and the UE_4, where the first message may include group information of the MCPTT groups to which the MCPTT_User3 and the MCPTT_User4 respectively belong.

An associated user of the UE_1 is a MCPTT_User1. A MCPTT group, to which the MCPTT_User1 belongs, belongs to an MCPTT system_1. The first floor control server and the first media server belong to the MCPTT system_1.

Step 1603: The first floor control server determines, according to the first message sent by the second floor control server, the floor request message sent by the UE_1, and a floor control policy, that an MCPTT user in a first MCPTT group belonging to an MCPTT system_2 occupies floor.

The first MCPTT group is a group to which the MCPTT_User3 belongs.

It should be noted that step 1603 is similar to step 1103, and details are not described herein.

Step 1604: The first floor control server sends a second message to the second floor control server, and sends a floor response message by using the first media server to an MCPTT user in another MCPTT group, so that transmission of user plane data in a group call in which multiple MCPTT systems participate is implemented the UE_1.

The second message is used to indicate that the MCPTT user in the first MCPTT group belonging to the MCPTT system_2 occupies the floor, and the floor response message sent to the UE_1 is used to indicate that floor occupation of a MCPTT_user1 is rejected.

Step 1605: The second floor control server determines, according to the second message and a floor control policy, that a MCPTT_user3 occupies the floor.

It should be noted that step 1605 is similar to step 1105, and details are not described herein.

Step 1606: The second floor control server sends a floor response message by using the second media server to the UE_3 and the UE_4.

The floor response message sent to the UE_3 is used to indicate that the MCPTT_user3 occupies the floor, and the floor response message sent to the UE_4 is used to indicate that floor occupation of the MCPTT_user4 is rejected.

Step 1607: A second media server receives user plane data sent by the UE_3.

Step 1608: The second media server sends the user plane data to the UE_4 and the first media server.

Step 1609: The first media server sends the user plane data to the UE_1.

A difference between this embodiment and the embodiment shown in FIG. 11 lies in that in this embodiment, a media server in a MCPTT system is required for all interaction between a floor control server and a UE. Implementation principles and effects thereof are similar, and are not described herein.

Figure 17:
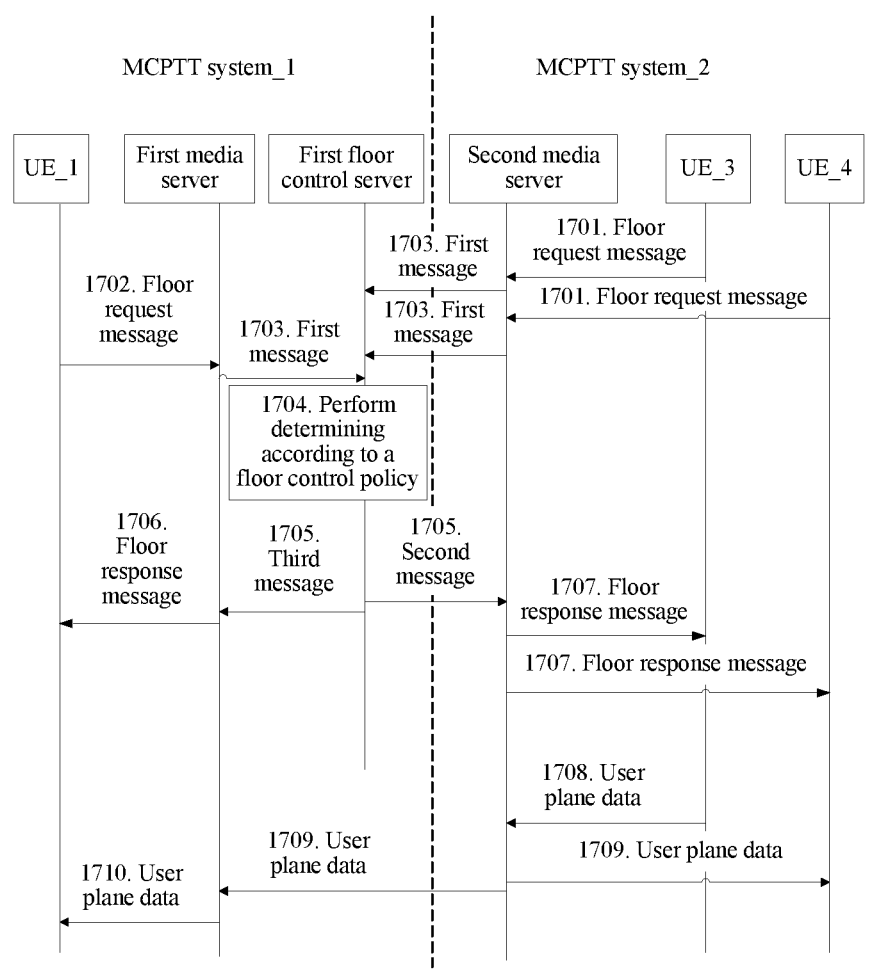
FIG. 17 is a flowchart of Embodiment 15 of a method for floor control on multiple MCPTT systems according to the present application.

FIG. 17 is a flowchart of Embodiment 15 of a method for floor control on multiple MCPTT systems according to the present application. This embodiment is applied to the application scenario shown in FIG. 2. As shown in FIG. 17, this embodiment may include the following steps.

Step 1701: A second media server receives a floor request message sent by UE_3 and UE_4.

An associated user of the UE_3 is a MCPTT_User3, and an associated user of the UE_4 is a MCPTT_User4. MCPTT groups, to which the MCPTT_User3 and the MCPTT_User4 respectively belong, belong to an MCPTT system_2. The second media server belongs to the MCPTT system_2.

Step 1702: A first media server receives a floor request message sent by UE_1.

An associated user of the UE_1 is a MCPTT_User1. A MCPTT group, to which the MCPTT_User1 belongs, belongs to an MCPTT system_1. The first media server belongs to the MCPTT system_1.

Step 1703: A first floor control server receives a first message sent by the first media server and the second media server.

The first floor control server belongs to the MCPTT system_1.

The first message sent by the first media server may be obtained by the first media server according to the floor request message sent by the UE_1, where the first message may include user information of the MCPTT_User1. The two first messages sent by the second media server may respectively be obtained by the second media server according to the floor request message sent by the UE_3 and the UE_4, where one message may include user information of the MCPTT_User3, and the other message may include user information of the MCPTT_User4.

Step 1704: The first floor control server determines, according to the first message sent by the first media server and the second media server and a floor control policy, that a MCPTT_User3 in an MCPTT group belonging to an MCPTT system_2 occupies floor.

Optionally, the floor control policy in step 1704 may be a policy based on a user priority.

Step 1705: The first floor control server sends a second message to the second floor control server, and sends a third message to the first media server.

The second message is used to indicate that the MCPTT_user3 in the MCPTT group belonging to the MCPTT system_2 occupies the floor, and the third message is used to indicate that floor occupation of an MCPTT user in an MCPTT group belonging to the MCPTT system_1 is rejected.

Step 1706: The first media server sends a floor response message to the UE_1 according to the third message.

The floor response message sent to the UE_1 is used to indicate that floor occupation of the MCPTT_User1 is rejected.

Step 1707: The second media server sends a floor response message to the UE_3 and the UE_4 according to the second message.

The floor response message sent to the UE_3 is used to indicate that the MCPTT_User3 occupies the floor, and the floor response message sent to the UE_4 is used to indicate that floor occupation of the MCPTT_User4 is rejected.

It should be noted that there is no sequence between step 1707 and step 1706.

Step 1708: The second media server receives user plane data sent by the UE_3.

Step 1709: The second media server sends the user plane data to the UE_4 and the first media server.

Step 1710: The first media server sends the user plane data to the UE_1.

In this embodiment, a first floor control server determines, according to a first message sent by a second media server and a first media server and a floor control policy, that a MCPTT_User3 in an MCPTT group belonging to an MCPTT system_2 occupies floor. The second floor control server receives a second message that is sent by the first floor control server and used to indicate that the MCPTT_User3 in the MCPTT group belonging to the MCPTT system_2 occupies the floor, and determines, according to the second message, that the MCPTT_User3 occupies the floor, so that floor control in a group session in which multiple MCPTT systems participate is implemented. Further, the second media server receives user plane data sent by UE_3, and sends the user plane data to the first media server, and the first media server forwards the user plane data to the UE_1, so that transmission of user plane data in a group call in which multiple MCPTT systems participate is implemented.

Figure 18:
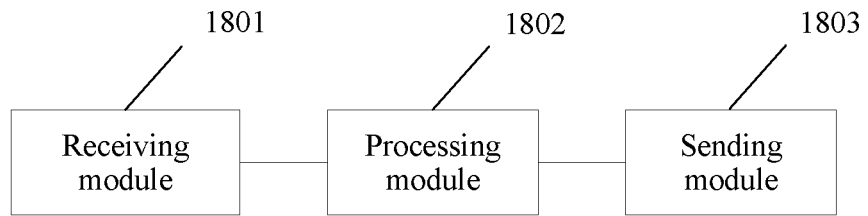
FIG. 18 is a schematic structural diagram of Embodiment 1 of an apparatus for floor control on multiple MCPTT systems according to the present application.

FIG. 18 is a schematic structural diagram of Embodiment 1 of an apparatus for floor control on multiple MCPTT systems according to the present application. The apparatus is a first floor control server. As shown in FIG. 18, the apparatus in this embodiment may include a receiving module 1801, a processing module 1802, and a sending module 1803. The receiving module 1801 is configured to receive a first message sent by N network element devices, where the first message is used to request floor from the first floor control server, N is an integer greater than or equal to 1, and the N network element devices respectively belong to N MCPTT systems. The processing module 1802 is configured to determine, according to the first message and a floor control policy, that an MCPTT user in an MCPTT group belonging to a first MCPTT system occupies the floor, where the first MCPTT system is an MCPTT system to which a first network element device belongs, and the first network element device is a network element device in the N network element devices. The sending module 1803 is configured to send a second message to the first network element device, where the second message is used to indicate that the MCPTT user in the MCPTT group belonging to the first MCPTT system occupies the floor.

Optionally, the sending module 1803 is further configured to send a third message to another network element device, where the other network element device is a device, except the first network element device, in the N network element devices.

The third message is used to indicate that floor occupation of an MCPTT user in an MCPTT group belonging to a third MCPTT system is rejected, or the third message includes queue information, where the queue information is used to indicate queuing of floor occupied by an MCPTT user in an MCPTT group belonging to the third MCPTT system, and the third MCPTT system is an MCPTT group to which the another network element device belongs.

Optionally, the network element device is a floor control server or a media server.

Optionally, the first message sent by the first network element device may include three cases, which respectively correspond to three implementation manners:

Manner 1: The first message sent by the first network element device includes group information of at least one MCPTT group, and the at least one MCPTT group includes a first MCPTT group; wherein the processing module 1802 is specifically configured to determine, according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

Optionally, the group information includes at least one of the following: a group identifier or a group priority.

Manner 2: The first message sent by the first network element device includes user information of a first MCPTT user; wherein the processing module 1802 is specifically configured to determine, according to the first message and the floor control policy, that the first MCPTT user in the MCPTT group belonging to the first MCPTT system occupies the floor; and wherein the second message is specifically used to indicate that the first MCPTT user in the MCPTT group belonging to the first MCPTT system occupies the floor.

Optionally, the user information includes at least one of the following: a user identifier, a user role, or user priority information.

Manner 3: The first message sent by the first network element device includes group information of a first MCPTT group; wherein the processing module 1802 is specifically configured to determine, according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

The apparatus in this embodiment can be configured to execute technical solutions of a first floor control server side in the method embodiment shown in FIG. 7 and the method embodiments shown in FIG. 11 to FIG. 17. Implementation principles and technical effects thereof are similar and are not described herein.

Embodiment 2 of Apparatus for Floor Control on Multiple MCPTT Systems

The apparatus in this embodiment is a first network element device. A structure of the apparatus in this embodiment is the same as the structure shown in FIG. 18, and also includes a receiving module, a processing module, and a sending module. The receiving module is configured to receive a floor request message sent by K user equipment (UEs), where K is an integer greater than or equal to 1, the first network element device belongs to a first MCPTT system, K MCPTT users are respectively associated with the K UEs, and MCPTT groups, to which the K MCPTT users respectively belong, belong to the first MCPTT system. The sending module is configured to send a first message to a first floor control server according to the floor request message, where the first message is used to request floor from the first floor control server. The receiving module is further configured to receive a second message sent by the first floor control server, where the second message is used to indicate that an MCPTT user in an MCPTT group belonging to the first MCPTT system occupies the floor. The processing module is configured to determine, according to the second message, that a first MCPTT user occupies the floor, where the first MCPTT user is an associated user of first UE, and the first UE is UE in the N UEs. The sending module is further configured to send a floor response message to the first UE, where the floor response message is used to indicate that the first MCPTT user occupies the floor.

Optionally, the first network element device is a second floor control server or a media server.

Optionally, the apparatus in this embodiment may be implemented in the following three manners:

Manner 1: The first message includes group information of the MCPTT groups to which the K MCPTT users requesting the floor from the first network element device belong, and the first MCPTT user belongs to a first MCPTT group; wherein the second message is specifically used to indicate that an MCPTT user in the first MCPTT group belonging to the first MCPTT system occupies the floor; and wherein the processing module is specifically configured to determine, according to the second message and a floor control policy and from the first MCPTT group, that the first MCPTT user occupies the floor.

Optionally, the group information includes at least one of the following: a group identifier or a group priority.

Manner 2: That the sending module sends the first message to the first floor control server according to the floor request message specifically includes: sending the first message to the first floor control server according to the floor request message sent by the K UEs and a floor control policy, where the first message includes user information of the first MCPTT user in the K MCPTT users requesting the floor from the second floor control server; and wherein the second message is specifically used to indicate that the first MCPTT user in the MCPTT group belonging to the first MCPTT system occupies the floor.

Optionally, the user information includes at least one of the following: a user identifier, a user role, or user priority information.

Manner 3: That the sending module sends the first message to the first floor control server according to the floor request message specifically includes: sending the first message to the first floor control server according to the floor request message and a floor control policy, where the first message includes group information of a first MCPTT group in the MCPTT groups to which the K MCPTT users requesting the floor from the second floor control server respectively belong, and the first MCPTT user belongs to the first MCPTT group; wherein the second message is specifically used to indicate that an MCPTT user in the first MCPTT group belonging to the first MCPTT system occupies the floor; and wherein the processing module is specifically configured to determine, according to the second message and a floor control policy and from the first MCPTT group, that the first MCPTT user occupies the floor.

Optionally, when an MCPTT system to which the first MCPTT user belongs is different from the first MCPTT system, that the receiving module receives the floor request message sent by the first UE specifically includes receiving the floor request message that is sent by the first UE directly to the first network element device; or receiving the floor request message that is sent by the first UE by using a second network element device to the first network element device.

The second network element device is a network element device in the MCPTT system to which the first MCPTT user belongs.

Optionally, when the first network element device is the second floor control server, that the receiving module receives the floor request message sent by the first UE specifically includes receiving the floor request message that is sent by the first UE directly to the second floor control server; or receiving the floor request message that is sent by the first UE by using the media server to the second floor control server.

The apparatus in this embodiment can be configured to execute technical solutions of a first network element device side in the method embodiment shown in FIG. 8 and the method embodiments shown in FIG. 11 to FIG. 17. Implementation principles and technical effects thereof are similar and are not described herein.

Figure 19:
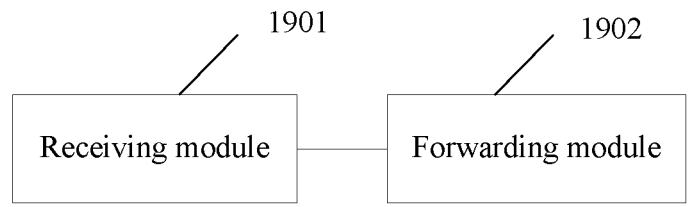
FIG. 19 is a schematic structural diagram of Embodiment 3 of an apparatus for floor control on multiple MCPTT systems according to the present application.

FIG. 19 is a schematic structural diagram of Embodiment 3 of an apparatus for floor control on multiple MCPTT systems according to the present application. The apparatus is a second media server. As shown in FIG. 19, the apparatus in this embodiment may include a receiving module 1901 and a forwarding module 1902. The receiving module 1901 is configured to receive user plane data sent by first UE. The forwarding module 1902 is configured to send the user plane data to a first media server, so that the first media server forwards the user plane data.

A MCPTT system to which a first floor control server belongs includes the first media server.

The apparatus in this embodiment can be configured to execute technical solutions of a second media server side in the method embodiment shown in FIG. 9 and the method embodiments shown in FIG. 11 to FIG. 17. Implementation principles and technical effects thereof are similar and are not described herein.

Embodiment 4 of Apparatus for Floor Control on Multiple MCPTT Systems

The apparatus in this embodiment is a first media server. A structure of the apparatus in this embodiment is the same as the structure shown in FIG. 19, and also includes a receiving module and a forwarding module. The receiving module is configured to receive user plane data of first UE sent by a second media server. The forwarding module is configured to forward the user plane data.

Optionally, the forwarding module is specifically configured to send the user plane data to second UE. An associated user of the second UE is an MCPTT user in an MCPTT group belonging to an MCPTT system to which a first floor control server belongs.

Optionally, when an MCPTT system to which the second UE belongs is different from the MCPTT system to which the first floor control server belongs, the forwarding module is specifically configured to: send the user plane data directly to the second UE; or send the user plane data by using a third media server to the second UE.

The MCPTT system to which the second UE belongs includes the third media server.

Optionally, the forwarding module is further configured to send the user plane data to a fourth media server, so that the fourth media server forwards the user plane data to third UE; wherein an associated user of the third UE is an MCPTT user in an MCPTT group belonging to a second MCPTT system, and the second MCPTT system includes the fourth media server.

The apparatus in this embodiment can be configured to execute technical solutions of a first media server side in the method embodiment shown in FIG. 10 and the method embodiments shown in FIG. 11 to FIG. 17. Implementation principles and technical effects thereof are similar and are not described herein.

Embodiment 5 of Apparatus for Floor Control on Multiple MCPTT Systems

The apparatus in this embodiment is a first floor control server. A structure of the apparatus in this embodiment is the same as the structure shown in FIG. 18, and also includes a receiving module, a processing module, and a sending module. The receiving module is configured to receive a first message sent by N network element devices, where the first message includes user information of an MCPTT user requesting floor from the network element device, the first message is used to request the floor from the first floor control server, N is an integer greater than or equal to 1, and the N network element devices respectively belong to N MCPTT systems. The processing module is configured to determine, according to the first message and a floor control policy, that a first MCPTT user belonging to a first MCPTT system occupies the floor, where the first MCPTT system is an MCPTT system to which a first network element device belongs, and the first network element device is a network element device in the N network element devices. The sending module is configured to send a second message to the first network element device, where the second message is used to indicate that the first MCPTT user belonging to the first MCPTT system occupies the floor.

Optionally, the user information includes at least one of the following: a user identifier, a user role, or user priority information.

The apparatus in this embodiment can be configured to execute technical solutions of a first floor control server side in the method embodiment shown in FIG. 3 and the method embodiment shown in FIG. 6. Implementation principles and technical effects thereof are similar and are not described herein.

Embodiment 6 of Apparatus for Floor Control on Multiple MCPTT Systems

The apparatus in this embodiment is a second media server. A structure of the apparatus in this embodiment is the same as the structure shown in FIG. 19, and also includes a receiving module and a forwarding module. The receiving module is configured to receive user plane data sent by first UE. The forwarding module is configured to send the user plane data to a first media server, so that the first media server forwards the user plane data.

A MCPTT system to which a first floor control server belongs includes the first media server.

The apparatus in this embodiment can be configured to execute technical solutions of a second media server side in the method embodiment shown in FIG. 4 and the method embodiment shown in FIG. 6. Implementation principles and technical effects thereof are similar and are not described herein.

Embodiment 7 of Apparatus for Floor Control on Multiple MCPTT Systems

The apparatus in this embodiment is a first media server. A structure of the apparatus in this embodiment is the same as the structure shown in FIG. 19, and also includes a receiving module and a forwarding module. The receiving module is configured to receive user plane data of first UE sent by a second media server. The forwarding module is configured to forward the user plane data.

Optionally, the forwarding module is specifically configured to send the user plane data to second UE. An associated user of the second UE is an MCPTT user belonging to an MCPTT system to which a first floor control server belongs.

Optionally, the forwarding module is further configured to send the user plane data to a third media server, so that the third media server forwards the user plane data to third UE.

An associated user of the third UE is an MCPTT user belonging to a second MCPTT system, and the second MCPTT system includes the third media server.

The apparatus in this embodiment can be configured to execute technical solutions of a first media server side in the method embodiment shown in FIG. 5 and the method embodiment shown in FIG. 6. Implementation principles and technical effects thereof are similar and are not described herein.

The present application further provides a system for floor control on multiple MCPTT systems. The system includes the first floor control server according to Embodiment 1 of the apparatus for floor control on multiple MCPTT systems, and the first network element device according to Embodiment 2 of the apparatus for floor control on multiple MCPTT systems.

Optionally, the system in this embodiment may further include the second media server according to Embodiment 3 of the apparatus for floor control on multiple MCPTT systems, and the first media server according to Embodiment 4 of the apparatus for floor control on multiple MCPTT systems.

The apparatus in this embodiment can be configured to execute technical solutions of the method embodiments shown in FIG. 7 to FIG. 17. Implementation principles and technical effects thereof are similar and are not described herein.

The present application further provides a system for floor control on multiple MCPTT systems. The system includes the first floor control server according to Embodiment 5 of the apparatus for floor control on multiple MCPTT systems, the second media server according to Embodiment 6 of the apparatus for floor control on multiple MCPTT systems, and the first media server according to Embodiment 7 of the apparatus for floor control on multiple MCPTT systems.

The apparatus in this embodiment can be configured to execute technical solutions of the method embodiments shown in FIG. 3 to FIG. 6. Implementation principles and technical effects thereof are similar and are not described herein.

Figure 20:
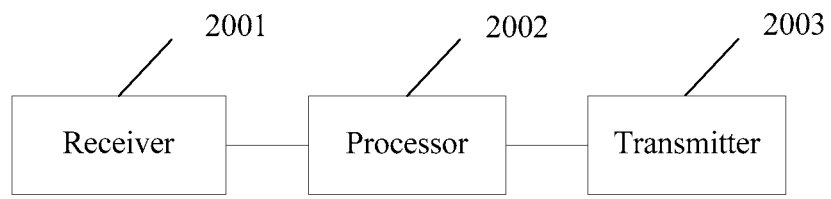
FIG. 20 is a schematic structural diagram of Embodiment 8 of an apparatus for floor control on multiple MCPTT systems according to the present application.

FIG. 20 is a schematic structural diagram of Embodiment 8 of an apparatus for floor control on multiple MCPTT systems according to the present application. The apparatus is a first floor control server. As shown in FIG. 20, the apparatus in this embodiment may include a receiver 2001, a processor 2002, and a transmitter 2003. The receiver 2001 is configured to receive a first message sent by N network element devices, where the first message is used to request floor from the first floor control server, N is an integer greater than or equal to 1, and the N network element devices respectively belong to N MCPTT systems. The processor 2002 is configured to determine, according to the first message and a floor control policy, that an MCPTT user in an MCPTT group belonging to a first MCPTT system occupies the floor, where the first MCPTT system is an MCPTT system to which a first network element device belongs, and the first network element device is a network element device in the N network element devices. The transmitter 2003 is configured to send a second message to the first network element device, where the second message is used to indicate that the MCPTT user in the MCPTT group belonging to the first MCPTT system occupies the floor.

Optionally, the transmitter 2003 is further configured to send a third message to another network element device, where the other network element device is a device, except the first network element device, in the N network element devices.

The third message is used to indicate that floor occupation of an MCPTT user in an MCPTT group belonging to a third MCPTT system is rejected, or the third message includes queue information, where the queue information is used to indicate queuing of floor occupied by an MCPTT user in an MCPTT group belonging to the third MCPTT system, and the third MCPTT system is an MCPTT group to which the another network element device belongs.

Optionally, the network element device is a floor control server or a media server.

Optionally, the first message sent by the first network element device may include three cases, which respectively correspond to three implementation manners:

Manner 1: The first message sent by the first network element device includes group information of at least one MCPTT group, and the at least one MCPTT group includes a first MCPTT group; wherein the processor 2002 is specifically configured to determine, according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

Optionally, the group information includes at least one of the following: a group identifier or a group priority.

Manner 2: The first message sent by the first network element device includes user information of a first MCPTT user; wherein the processor 2002 is specifically configured to determine, according to the first message and the floor control policy, that the first MCPTT user in the MCPTT group belonging to the first MCPTT system occupies the floor; and wherein the second message is specifically used to indicate that the first MCPTT user in the MCPTT group belonging to the first MCPTT system occupies the floor.

Optionally, the user information includes at least one of the following: a user identifier, a user role, or user priority information.

Manner 3: The first message sent by the first network element device includes group information of a first MCPTT group; wherein the processor 2002 is specifically configured to determine, according to the first message and the floor control policy, that an MCPTT user in the first MCPTT group belonging to the first MCPTT system occupies the floor; and wherein the second message is specifically used to indicate that the MCPTT user in the first MCPTT group belonging to the first MCPTT system occupies the floor.

The apparatus in this embodiment can be configured to execute technical solutions of a first floor control server side in the method embodiment shown in FIG. 7 and the method embodiments shown in FIG. 11 to FIG. 17. Implementation principles and technical effects thereof are similar and are not described herein.

Embodiment 9 of Apparatus for Floor Control on Multiple MCPTT Systems

The apparatus in this embodiment is a first network element device. A structure of the apparatus in this embodiment is the same as the structure shown in FIG. 20, and also includes a receiver, a processor, and a transmitter. The receiver is configured to receive a floor request message sent by K user equipment (UEs), where K is an integer greater than or equal to 1, the first network element device belongs to a first MCPTT system, K MCPTT users are respectively associated with the K UEs, and MCPTT groups to which the K MCPTT users respectively belong, belong to the first MCPTT system. The transmitter is configured to send a first message to a first floor control server according to the floor request message, where the first message is used to request floor from the first floor control server. The receiver is further configured to receive a second message sent by the first floor control server, where the second message is used to indicate that an MCPTT user in an MCPTT group belonging to the first MCPTT system occupies the floor. The processor is configured to determine, according to the second message, that a first MCPTT user occupies the floor, where the first MCPTT user is an associated user of first UE, and the first UE is UE in the N UEs. The transmitter is further configured to send a floor response message to the first UE, where the floor response message is used to indicate that the first MCPTT user occupies the floor.

Optionally, the first network element device is a second floor control server or a media server.

Optionally, the apparatus in this embodiment may be implemented in the following three manners:

Manner 1: The first message includes group information of the MCPTT groups to which the K MCPTT users requesting the floor from the first network element device belong, and the first MCPTT user belongs to a first MCPTT group; wherein the second message is specifically used to indicate that an MCPTT user in the first MCPTT group belonging to the first MCPTT system occupies the floor; and wherein the processor is specifically configured to determine, according to the second message and a floor control policy and from the first MCPTT group, that the first MCPTT user occupies the floor.

Optionally, the group information includes at least one of the following: a group identifier or a group priority.

Manner 2: That the transmitter sends the first message to the first floor control server according to the floor request message specifically includes: sending the first message to the first floor control server according to the floor request message sent by the K UEs and a floor control policy, where the first message includes user information of the first MCPTT user in the K MCPTT users requesting the floor from the second floor control server; and wherein the second message is specifically used to indicate that the first MCPTT user in the MCPTT group belonging to the first MCPTT system occupies the floor.

Optionally, the user information includes at least one of the following: a user identifier, a user role, or user priority information.

Manner 3: That the transmitter sends the first message to the first floor control server according to the floor request message specifically includes: sending the first message to the first floor control server according to the floor request message and a floor control policy, where the first message includes group information of a first MCPTT group in the MCPTT groups to which the K MCPTT users requesting the floor from the second floor control server respectively belong, and the first MCPTT user belongs to the first MCPTT group; wherein the second message is specifically used to indicate that an MCPTT user in the first MCPTT group belonging to the first MCPTT system occupies the floor; and wherein the processor is specifically configured to determine, according to the second message and a floor control policy and from the first MCPTT group, that the first MCPTT user occupies the floor.

Optionally, when an MCPTT system to which the first MCPTT user belongs is different from the first MCPTT system, that the receiver receives the floor request message sent by the first UE specifically includes receiving the floor request message that is sent by the first UE directly to the first network element device; or receiving the floor request message that is sent by the first UE by using a second network element device to the first network element device. The second network element device is a network element device in the MCPTT system to which the first MCPTT user belongs.

Optionally, when the first network element device is the second floor control server, that the receiver receives the floor request message sent by the first UE specifically includes receiving the floor request message that is sent by the first UE directly to the second floor control server; or receiving the floor request message that is sent by the first UE by using the media server to the second floor control server.

The apparatus in this embodiment can be configured to execute technical solutions of a first network element device side in the method embodiment shown in FIG. 8 and the method embodiments shown in FIG. 11 to FIG. 17. Implementation principles and technical effects thereof are similar and are not described herein.

Figure 21:
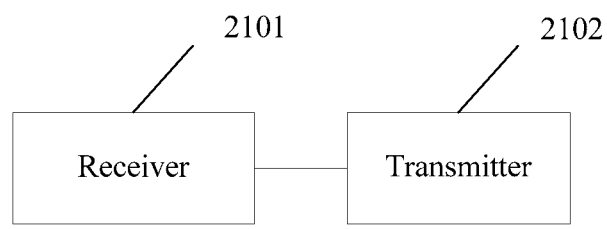
FIG. 21 is a schematic structural diagram of Embodiment 10 of an apparatus for floor control on multiple MCPTT systems according to the present application.

FIG. 21 is a schematic structural diagram of Embodiment 10 of an apparatus for floor control on multiple MCPTT systems according to the present application. The apparatus is a second media server. As shown in FIG. 21, the apparatus in this embodiment may include a receiver 2101 and a transmitter 2102. The receiver 2101 is configured to receive user plane data sent by first UE. The transmitter 2102 is configured to send the user plane data to a first media server, so that the first media server forwards the user plane data.

A MCPTT system to which a first floor control server belongs includes the first media server.

The apparatus in this embodiment can be configured to execute technical solutions of a second media server side in the method embodiment shown in FIG. 9 and the method embodiments shown in FIG. 11 to FIG. 17. Implementation principles and technical effects thereof are similar and are not described herein.

Embodiment 11 of Apparatus for Floor Control on Multiple MCPTT Systems

The apparatus in this embodiment is a first media server. A structure of the apparatus in this embodiment is the same as the structure shown in FIG. 21, and also includes a receiver and a transmitter. The receiver is configured to receive user plane data of first UE sent by a second media server. The transmitter is configured to forward the user plane data.

Optionally, the transmitter is specifically configured to send the user plane data to second UE, where an associated user of the second UE is an MCPTT user in an MCPTT group belonging to an MCPTT system to which a first floor control server belongs.

Optionally, when an MCPTT system to which the second UE belongs is different from the MCPTT system to which the first floor control server belongs, the transmitter is specifically configured to: send the user plane data directly to the second UE; or send the user plane data by using a third media server to the second UE.

The MCPTT system to which the second UE belongs includes the third media server.

Optionally, the transmitter is further configured to send the user plane data to a fourth media server, so that the fourth media server forwards the user plane data to third UE.

An associated user of the third UE is an MCPTT user in an MCPTT group belonging to a second MCPTT system, and the second MCPTT system includes the fourth media server.

The apparatus in this embodiment can be configured to execute technical solutions of a first media server side in the method embodiment shown in FIG. 10 and the method embodiments shown in FIG. 11 to FIG. 17. Implementation principles and technical effects thereof are similar and are not described herein.

Embodiment 12 of Apparatus for Floor Control on Multiple MCPTT Systems

The apparatus in this embodiment is a first floor control server. A structure of the apparatus in this embodiment is the same as the structure shown in FIG. 20, and also includes a receiver, a processor, and a transmitter. The receiver is configured to receive a first message sent by N network element devices, where the first message includes user information of an MCPTT user requesting floor from the network element device, the first message is used to request the floor from the first floor control server, N is an integer greater than or equal to 1, and the N network element devices respectively belong to N MCPTT systems. The processor is configured to determine, according to the first message and a floor control policy, that a first MCPTT user belonging to a first MCPTT system occupies the floor, where the first MCPTT system is an MCPTT system to which a first network element device belongs, and the first network element device is a network element device in the N network element devices. The transmitter is configured to send a second message to the first network element device, where the second message is used to indicate that the first MCPTT user belonging to the first MCPTT system occupies the floor.

Optionally, the user information includes at least one of the following: a user identifier, a user role, or user priority information.

The apparatus in this embodiment can be configured to execute technical solutions of a first floor control server side in the method embodiment shown in FIG. 3 and the method embodiment shown in FIG. 6. Implementation principles and technical effects thereof are similar and are not described herein.

Embodiment 13 of Apparatus for Floor Control on Multiple MCPTT Systems

The apparatus in this embodiment is a second media server. A structure of the apparatus in this embodiment is the same as the structure shown in FIG. 21, and also includes a receiver and a transmitter. The receiver is configured to receive user plane data sent by first UE. The transmitter is configured to send the user plane data to a first media server, so that the first media server forwards the user plane data.

A MCPTT system to which a first floor control server belongs includes the first media server.

The apparatus in this embodiment can be configured to execute technical solutions of a second media server side in the method embodiment shown in FIG. 4 and the method embodiment shown in FIG. 6. Implementation principles and technical effects thereof are similar and are not described herein.

Embodiment 14 of Apparatus for Floor Control on Multiple MCPTT Systems

The apparatus in this embodiment is a first media server. A structure of the apparatus in this embodiment is the same as the structure shown in FIG. 21, and also includes a receiver and a transmitter. The receiver is configured to receive user plane data of first UE sent by a second media server. The transmitter is configured to forward the user plane data.

Optionally, the transmitter is specifically configured to send the user plane data to second UE. An associated user of the second UE is an MCPTT user belonging to an MCPTT system to which a first floor control server belongs.

Optionally, the transmitter is further configured to send the user plane data to a third media server, so that the third media server forwards the user plane data to third UE.

An associated user of the third UE is an MCPTT user belonging to a second MCPTT system, and the second MCPTT system includes the third media server.

The apparatus in this embodiment can be configured to execute technical solutions of a first media server side in the method embodiment shown in FIG. 5 and the method embodiment shown in FIG. 6. Implementation principles and technical effects thereof are similar and are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present application, but not to limit the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A system for floor control on multiple mission critical push to talk (MCPTT) systems, the system comprising:
   a first floor control server; and
   a second floor control server;
   wherein the second floor control server is associated with a first MCPTT system, and is configured to:
      receive a first floor request message from a first user equipment (UE) associated with a first MCPTT user, and receive a second floor request message from a second UE associated with a second MCPTT user, wherein the first MCPTT user belongs to a first MCPTT group and the second MCPTT user belongs to a second MCPTT group, and wherein both the first MCPTT group and the second MCPTT group belong to the first MCPTT system;
      determine, for the first MCPTT system based on a first policy, a first message from received messages associated with different groups within the first MCPTT system, the received messages comprising the first floor request message and the second floor request message;
      send the first message to the first floor control server, wherein the first message comprises user information of the first MCPTT user and a first group priority of the first MCPTT group; and
   wherein the first floor control server is associated with a second MCPTT system, and is configured to:
      receive the first message from the second floor control server;
      receive a third floor request message from a third UE associated with a third MCPTT user, wherein the third MCPTT user belongs to the second MCPTT system, and the third MCPTT user belongs to a third MCPTT group;
      determine, based on a second policy, which MCPTT user from the first MCPTT user and the third MCPTT user will be granted a floor in the first MCPTT system and the second MCPTT system, wherein the second policy is based on user priority, and wherein the second policy is based on the first group priority and a second group priority of the third MCPTT group; and
      send a second message to the second floor control server in response to the floor being granted to the first MCPTT user, wherein the second message indicates that the floor is granted to the first MCPTT user, and send a third message to the third UE, wherein the third message comprises first queue information, and the first queue information indicates a position of a floor request for the third MCPTT user in a queue, or
      send a fourth message to the third UE in response to the floor being granted to the third MCPTT user, wherein the fourth message indicates that the floor is granted to the third MCPTT user, and send a fifth message to the second floor control server, wherein the fifth message comprises second queue information, and the second queue information indicates a position of a floor request for the first MCPTT user in a queue.

2. The system according to claim 1, wherein the user information comprises at least one of a user identifier or priority information.

3. The system according to claim 2, wherein the priority information is user priority information.

4. The system according to claim 1, wherein the second floor control server is further configured to send a second floor response message to the second UE, and wherein the second floor response message indicates that a request of the second UE corresponding to the second floor request message is rejected.

5. The system according to claim 1, wherein the second floor control server is further configured to:
   receive the second message from the first floor control server, wherein the second message indicates that the floor is granted to the first MCPTT user;
   determine, according to the second message, that the floor is granted to the first MCPTT user; and
   send a first floor response message to the first UE, wherein the first floor response message indicates that the floor is granted to the first MCPTT user.

6. The system according to claim 1, wherein the first policy is based on user priority.

7. The system according to claim 1, wherein the first policy instructs how to grant the floor based on an order in which the first floor request message and the second floor request message are received.

8. The system according to claim 7, wherein the first floor request message is received earlier than the second floor request message.

9. A method for floor control on multiple mission critical push to talk (MCPTT) systems, the method comprising:
   receiving, by a second floor control server associated with a first MCPTT system, a first floor request message from a first user equipment (UE) associated with a first MCPTT user and a second floor request message from a second UE associated with a second MCPTT user, wherein the first MCPTT user belongs to a first MCPTT group and the second MCPTT user belongs to a second MCPTT group, and wherein both the first MCPTT group and the second MCPTT group belong to the first MCPTT system;

determining, by the second floor control server for the first MCPTT system based on a first policy, a first message from received messages associated with different groups within the first MCPTT system, the received messages comprising the first floor request message and the second floor request message;

sending, by the second floor control server, the first message to a first floor control server, wherein the first message comprises user information of the first MCPTT user and a first group priority of the first MCPTT group;

receiving, by the first floor control server associated with a second MCPTT system, the first message from the second floor control server;

receiving, by the first floor control server, a third floor request message from a third UE associated with a third MCPTT user, wherein the third MCPTT user belongs to the second MCPTT system, and the third MCPTT user belongs to a third MCPTT group;

determining, by the first floor control server based on a second policy, which MCPTT user from the first MCPTT user and the third MCPTT user will be granted a floor in the first MCPTT system and the second MCPTT system, wherein the second policy is based on the first group priority and a second group priority of the third MCPTT group; and performing the following by the first floor control server:
sending a second message to the second floor control server in response to the floor being granted to the first MCPTT user, wherein the second message indicates that the floor is granted to the first MCPTT user, and sending a third message to the third UE, wherein the third message comprises first queue information, and the first queue information indicates a position of a floor request for the third MCPTT user in a queue, or sending a fourth message to the third UE in response to the floor being granted to the third MCPTT user, wherein the fourth message indicates that the floor is granted to the third MCPTT user, and sending a fifth message to the second floor control server, wherein the fifth message comprises second queue information, and the second queue information indicates a position of a floor request for the first MCPTT user in a queue.

10. The method according to claim 9, wherein the user information comprises at least one of a user identifier or priority information.

11. The method according to claim 10, wherein the priority information is user priority information.

12. The method according to claim 9, further comprising:
sending, by the second floor control server, a second floor response message to the second UE, wherein the second floor response message indicates that a request of the second UE corresponding to the second floor request message is rejected.

13. The method according to claim 9, further comprising:
receiving, by the second floor control server, the second message from the first floor control server, wherein the second message indicates that the floor is granted to the first MCPTT user;
determining, by the second floor control server, according to the second message, that the floor is granted to the first MCPTT user; and
sending, by the second floor control server, a first floor response message to the first UE, wherein the first floor response message indicates that the floor is granted to the first MCPTT user.

14. The method according to claim 9, wherein the first policy is based on user priority.

15. The method according to claim 9, wherein the first policy instructs how to grant the floor based on an order in which the first floor request message and the second floor request message are received.

16. The method according to claim 15, wherein the first floor request message is received earlier than the second floor request message.

17. The method according to claim 9, wherein the first policy is based on user priority.

18. The method according to claim 9, wherein the first policy instructs how to grant the floor based on an order in which the first floor request message and the second floor request message are received.

* * * * *